(12) United States Patent
Kim

(10) Patent No.: US 10,047,925 B2
(45) Date of Patent: Aug. 14, 2018

(54) HEADLAMP FOR VEHICLE

(71) Applicant: LG ELECTRONICS INC., Seoul (KR)

(72) Inventor: Geunhyeong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 69 days.

(21) Appl. No.: 15/191,645

(22) Filed: Jun. 24, 2016

(65) Prior Publication Data

US 2016/0377251 A1 Dec. 29, 2016

(30) Foreign Application Priority Data

Jun. 24, 2015 (KR) ........................ 10-2015-0089888

(51) Int. Cl.
*B60Q 1/00* (2006.01)
*F21S 41/64* (2018.01)
(Continued)

(52) U.S. Cl.
CPC ................ *F21S 41/64* (2018.01); *B60Q 1/08* (2013.01); *B60Q 1/14* (2013.01); *B60Q 1/143* (2013.01); *F21S 41/141* (2018.01); *F21S 41/285* (2018.01); *F21S 41/30* (2018.01); *F21S 41/645* (2018.01); *F21S 41/657* (2018.01); *G06K 9/00228* (2013.01); *G06K 9/00791* (2013.01); *B60Q 2300/054* (2013.01); *B60Q 2300/056* (2013.01); *B60Q 2300/32* (2013.01); *B60Q 2300/41* (2013.01); *B60Q 2300/42* (2013.01);
(Continued)

(58) Field of Classification Search
CPC .... F21S 48/115; F21S 48/1731; F21S 48/145; F21S 48/1258; B60Q 1/143; B60Q 2300/32; B60Q 2300/45; B60Q 2300/42
See application file for complete search history.

(56) References Cited

U.S. PATENT DOCUMENTS

2003/0202357 A1 10/2003 Strazzanti
2009/0190323 A1* 7/2009 Watanabe ............. B60Q 1/143
362/37
(Continued)

FOREIGN PATENT DOCUMENTS

DE 102008014182 9/2009
DE 102012200048 7/2013
(Continued)

OTHER PUBLICATIONS

Extended European Search Report issued in European Application No. 16174981.7 dated Nov. 15, 2016, 9 pages.
HELLAGroup, "HELLA Matrix LED System," youtube.com, Apr. 28, 2014, 1 page, XP054976889.

*Primary Examiner* — Evan Dzierzynski
(74) *Attorney, Agent, or Firm* — Fish & Richardson P.C.

(57) ABSTRACT

A headlamp, for a vehicle, that includes an interface unit configured to receive information about an object external to the vehicle, at least one light source configured to generate light, and a transparent display configured to allow at least a portion of the light to pass through the transparent display. The headlamp also includes a processor configured to control the transparent display to darken one area of the transparent display to block transmission of the light through the area of the transparent display, the area of the transparent display being less than an entirety of the transparent display is disclosed.

14 Claims, 30 Drawing Sheets

(51) Int. Cl.
  *F21S 41/657* (2018.01)
  *F21S 41/30* (2018.01)
  *F21S 41/141* (2018.01)
  *B60Q 1/14* (2006.01)
  *B60Q 1/08* (2006.01)
  *G06K 9/00* (2006.01)
  *F21S 41/20* (2018.01)
  *B60R 11/04* (2006.01)
  *F21S 41/255* (2018.01)
  *F21S 41/32* (2018.01)
  *F21S 41/43* (2018.01)

(52) U.S. Cl.
  CPC ........... *B60Q 2300/45* (2013.01); *B60R 11/04* (2013.01); *F21S 41/255* (2018.01); *F21S 41/321* (2018.01); *F21S 41/43* (2018.01)

(56) References Cited

U.S. PATENT DOCUMENTS

2015/0151669 A1* 6/2015 Meisner ................ B60Q 1/085
  701/49
2016/0152174 A1* 6/2016 Hagisato ................ B60Q 1/143
  362/466

FOREIGN PATENT DOCUMENTS

| | | |
|---|---|---|
| EP | 2233356 | 9/2010 |
| JP | 2000211422 | 8/2000 |
| JP | 2014144725 A | 8/2014 |
| KR | 10-2011-0043348 | 4/2011 |
| KR | 10-2012-0056496 | 6/2012 |
| KR | 10-2015-0068833 | 6/2015 |
| KR | 10-2016-0112429 | 9/2016 |
| WO | 2015/033900 | 3/2015 |

* cited by examiner

HEADLAMP FOR VEHICLE

CROSS-REFERENCE TO RELATED APPLICATION

This application claims the priority benefit of Korean Patent Application No. 10-2015-0089888, filed on Jun. 24, 2015 in the Korean Intellectual Property Office, the disclosure of which is incorporated herein by reference.

FIELD

The present disclosure generally relates to a headlamp for a vehicle.

BACKGROUND

A vehicle is an apparatus that moves in a specific direction as a driver operates. A common example of a vehicle is a car. A vehicle can be equipped with various lamps including a headlamp and a rear combination lamp.

SUMMARY

A headlamp for a vehicle includes a transparent display to control light emitted from the headlamp.

In general, one innovative aspect of the subject matter described in this specification can be embodied in a headlamp for a vehicle including an interface unit configured to receive information about an object external to the vehicle; at least one light source configured to generate light; a transparent display configured to allow at least a portion of the light to pass through the transparent display; and a processor configured to control the transparent display to darken one area of the transparent display to block transmission of the light through the area of the transparent display, the area of the transparent display being less than an entirety of the transparent display.

The foregoing and other embodiments can each optionally include one or more of the following features, alone or in combination. In particular, one embodiment includes all the following features in combination. The processor is configured to darken the one area gradually based on a distance to the object. The processor is configured to change a location or a size of the area within the transparent display based on a location or a size of the object. The object is a vehicle traveling in opposite direction, a foregoing vehicle, or a pedestrian. When the object is the vehicle traveling in the opposite lane, the processor is configured to control the transparent display to darken one area of the transparent display based on a windshield of the vehicle traveling in the opposite lane. The processor is configured to darken one area of the transparent display based on a part of the windshield of the vehicle traveling in the opposite lane, a face of a driver of the vehicle traveling in the opposite lane being positioned at the part of the windshield. When the vehicle traveling in the opposite lane includes a plurality of vehicles traveling in the opposite lane, the processor is configured to darken an area based on the windshield of each of the vehicles traveling in the opposite lane. When the object is the foregoing vehicle, the processor is configured to control the transparent display to darken one area of the transparent display based on at least one of a rear windshield, side-view mirrors, and a rearview mirror of the foregoing vehicle. When the foregoing vehicle includes a plurality of foregoing vehicles, the processor is configured to darken an area of the transparent display based on at least one of a rear windshield, side-view mirrors, and a rearview mirror of each of the foregoing vehicles. The plurality of foregoing vehicles travels on the same lane or neighboring lanes. Where the object is the pedestrian, the processor is configured to darken one area of the transparent display corresponding to a face of the pedestrian. The processor is configured to receive information about curve, uphill road, or downhill road of a driving lane; change position of the light in response to the information about curve, uphill road, or downhill road of the driving lane; and darken the area of the transparent display corresponding to the object based on the changed position of the light. The headlamp further includes an aspheric lens configured to allow the light generated by the light source to be refracted and pass through the aspheric lens, wherein the transparent display is disposed at a front end or rear end of the aspheric lens. The headlamp further includes an outer lens covering an opening of the headlamp, wherein the transparent display is disposed at a rear end of the outer lens.

In general, another innovative aspect of the subject matter described in this specification can be embodied in an adaptive driver assistance system including a camera to acquire an image of a vehicle traveling in opposite lane; and a processor configured to detect an object through a windshield of the vehicle traveling in the opposite lane from the acquired image, and provide information about the object to a headlamp through an interface unit.

The foregoing and other embodiments can each optionally include one or more of the following features, alone or in combination. In particular, one embodiment includes all the following features in combination. The processor is configured to detect a face of a driver in the vehicle traveling in the opposite lane, and provide information about the driver in the vehicle to the headlamp through the interface unit, wherein the face of the driver of the vehicle traveling in the opposite lane being detected through a part of the windshield. The camera acquires one or more images of a plurality of vehicles traveling in the opposite lane, and the processor is configured to detect objects through windshields of the plurality of vehicles traveling in the opposite lane from the one or more acquired images, and provide information about the object to the headlamp through the interface unit.

In general, another innovative aspect of the subject matter described in this specification can be embodied in an adaptive driver assistance system including a camera to acquire an image of a foregoing vehicle; and a processor configured to detect at least one of side-view mirrors, a rear windshield, or a rearview mirror of the foregoing vehicle from the acquired image, and provide information about at least one of the side-view mirrors, the rear windshield, or the rearview mirror of the foregoing vehicle to a headlamp through an interface unit.

The foregoing and other embodiments can each optionally include one or more of the following features, alone or in combination. In particular, one embodiment includes all the following features in combination. The camera acquires one or more images of a plurality of foregoing vehicles, and the processor is configured to detect at least one of side-view mirrors, a rear windshield, or a rearview mirror of each of the foregoing vehicles, and provide the headlamp with information about at least one of side-view mirrors, the rear windshield, or the rearview mirror of each foregoing vehicles through the interface unit.

In general, another innovative aspect of the subject matter described in this specification can be embodied in a vehicle including an adaptive driver assistance system that includes a camera to acquire an image of a vehicle; a first processor configured to detect a vehicle traveling in opposite lane or a foregoing vehicle from the acquired image; and a first interface unit to transmit information about the detected vehicle traveling in the opposite lane or information about the detected foregoing vehicle to a headlamp; and the headlamp including a second interface unit configured to receive the information about the detected vehicle traveling in the opposite lane or the information about the detected foregoing vehicle; at least one light source to generate light; a transparent display configured to allow at least a portion of the light to pass through the transparent display; and a second processor configured to, based on the information about the detected vehicle traveling in the opposite lane or the information about the detected foregoing vehicle, control the transparent display to darken an area of the transparent display to block transmission of the light through the area of the transparent display, the area of the transparent display being less than an entirety of the transparent display.

BRIEF DESCRIPTION OF THE DRAWINGS

Like reference numbers and designations in the various drawings indicate like elements.

DETAILED DESCRIPTION

A vehicle described in this specification may include a car and a motorcycle. Hereinafter, description will be given focusing on a car as the vehicle.

The vehicle described in this specification may include a motor vehicle equipped with an internal combustion engine as a power source, a hybrid vehicle equipped with both an engine and an electric motor as a power source, and an electric vehicle equipped with an electric motor as a power source.

In the description given below, the left side of a vehicle indicates the left side with respect to the forward driving direction of the vehicle, and the right side of the vehicle indicates the right side with respect to the forward driving direction of the vehicle.

In the description given below, the term "front" indicates the forward driving direction of the vehicle, and "rear" indicates the rearward driving direction of the vehicle.

Figure 1:
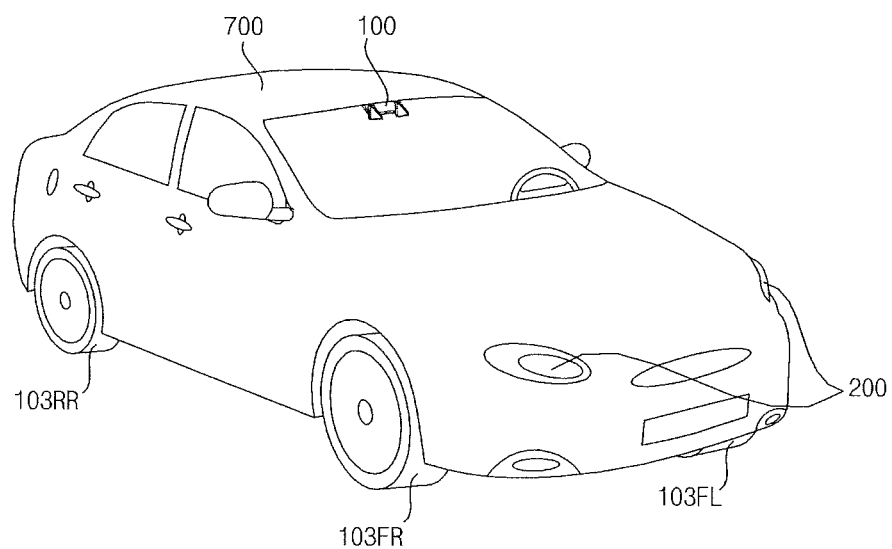
FIG. 1 is a diagram illustrating an example exterior of a vehicle including a headlamp for a vehicle.
Figure 1:
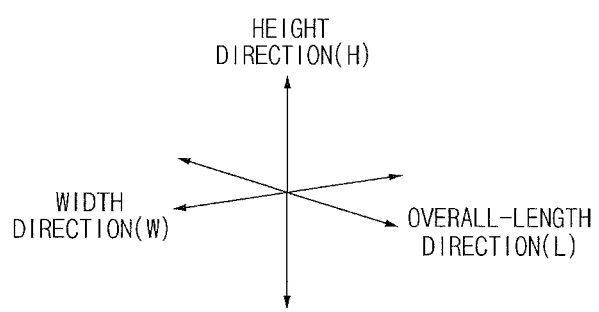

FIG. 1 illustrates an example exterior of a vehicle including a headlamp for a vehicle.

Referring to FIG. 1, a vehicle 700 may include wheels 103FR, 103FL, 103RR rotated by a power source, a driver assistance system 100 provided in the vehicle 700, and headlamps 200.

Figure 7A:
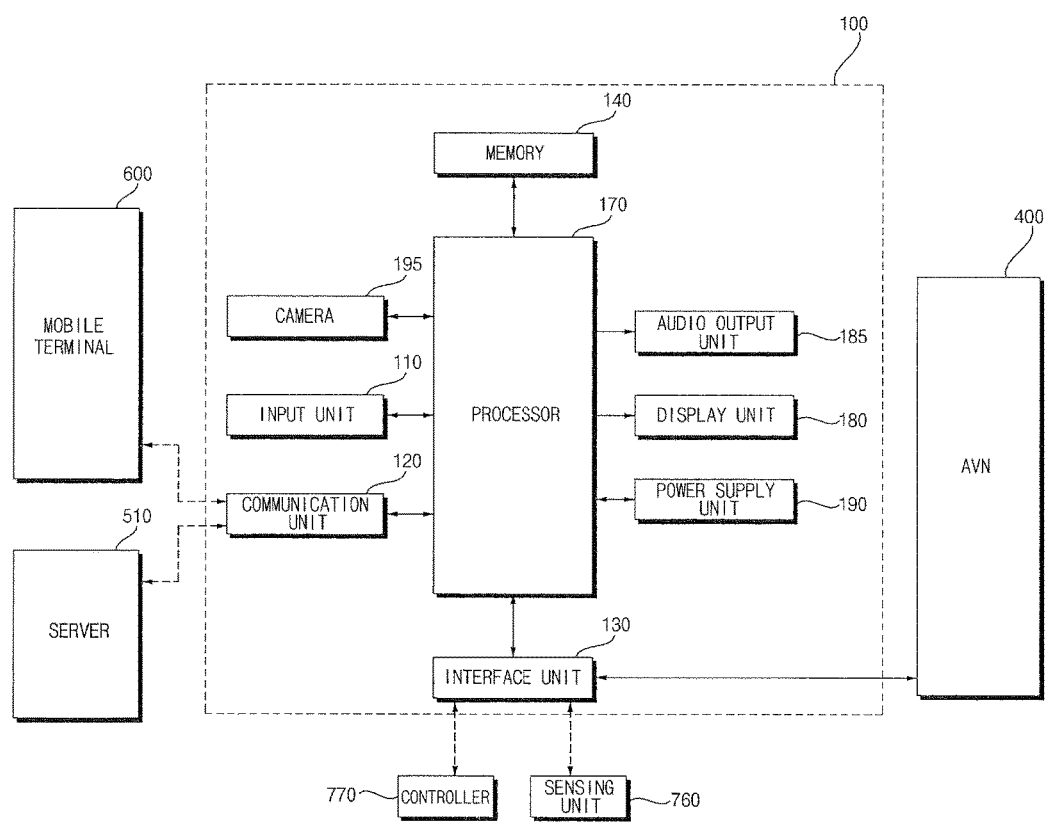
FIGS. 7A, 7B, and 7C are block diagrams illustrating an example interior of a driver assistance system.
Figure 7B:
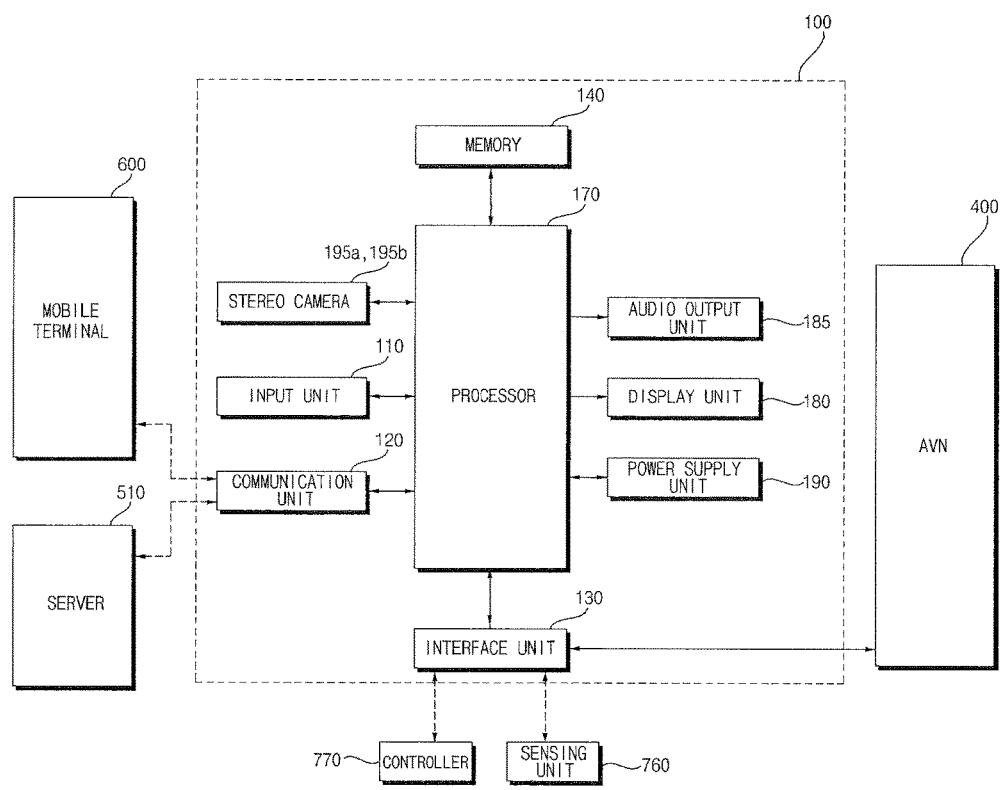
Figure 7C:
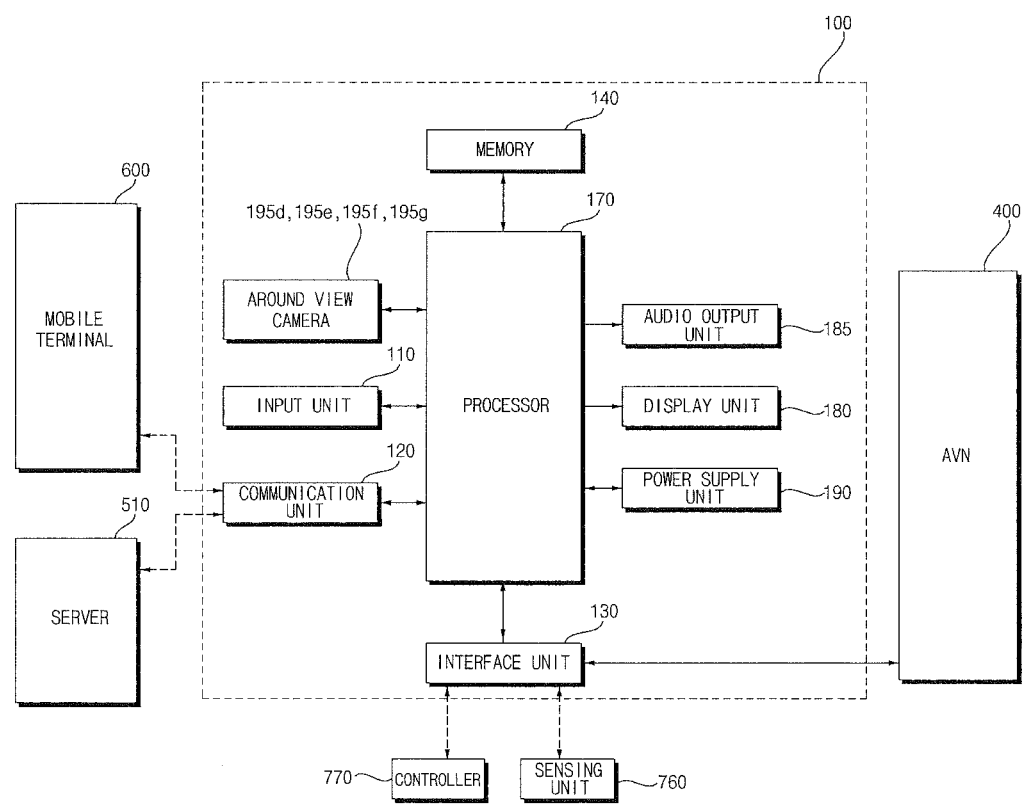

The adaptive driver assistance system 100 may be provided with at least one camera, and images acquired by the at least one camera may be signal-processed in a processor 170 (see FIGS. 7A to 7C).

In the illustrated example, the adaptive driver assistance system 100 is provided with two cameras.

The headlamp may include a 2-light type, 4-light type and a 6-light type. In addition, light output from the headlamp may be white or yellow. Configuration and color of light of the headlamp are variable according to the regulations of each nation or situations, and not intended to limit the scope of the present invention.

Meanwhile, the overall length refers to the length of the vehicle 700 from the front to back of the vehicle, the width refers to width of the vehicle 700, and the height refers to the distance from the bottom of a wheel to the roof of the vehicle. In the description below, the overall-length direction L may indicate a direction in which measurement of overall length of the vehicle 700 is performed, the width direction W may indicate a direction in which measurement of width of the vehicle 700 is performed, and the height direction H may indicate a direction in which measurement of height of the vehicle 700 is performed.

Figure 2:
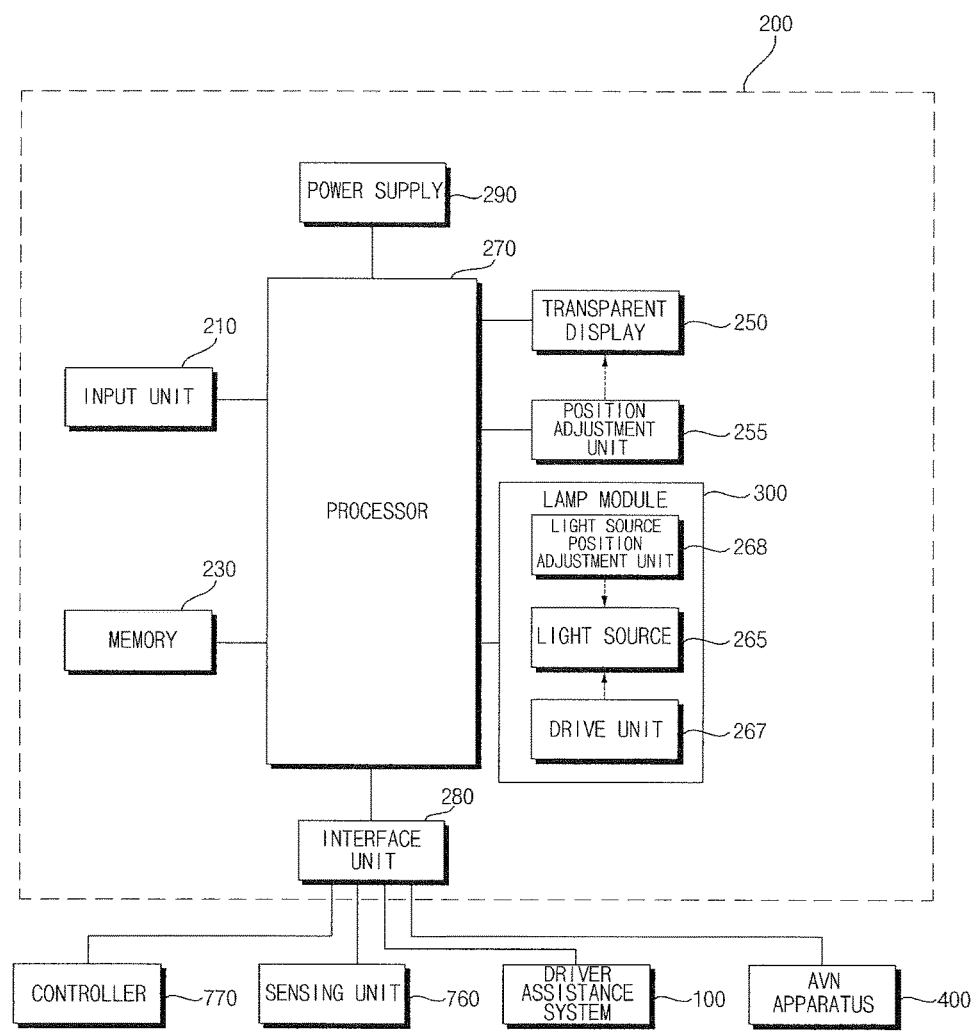
FIG. 2 is a block diagram illustrating an example headlamp for a vehicle.

FIG. 2 illustrates an example headlamp for a vehicle.

Referring to FIG. 2, a headlamp 200 may include an input unit 210, a memory 230, a transparent display 250, a position adjustment unit 255, a lamp module 300, a processor 270, an interface unit 280, and a power supply 290.

The input unit 210 may include an input unit capable of receiving a user input for controlling operation of the headlamp 200. The input unit 210 may be disposed in the vehicle 700. The input unit 210 may include a touch input unit or a mechanical input unit. The input unit 210 may receive a user input for turning on or off the headlamp 200. The input unit 210 may receive user inputs for controlling various operations of the headlamp 200.

The input unit 210 may receive a user input for controlling a lamp module 300.

The memory 230 may store basic data for each unit of the headlamp 200, control data for controlling operation of each unit, and data input to and output from the headlamp 200. When implemented through hardware, the memory 230 may include various storage devices such as a ROM, RAM, EPROM, flash drive, and hard drive.

The memory 230 may store various kinds of data for overall operation of the headlamp 200 including a program for processing or controlling operation of the processor 270.

Figure 3A:
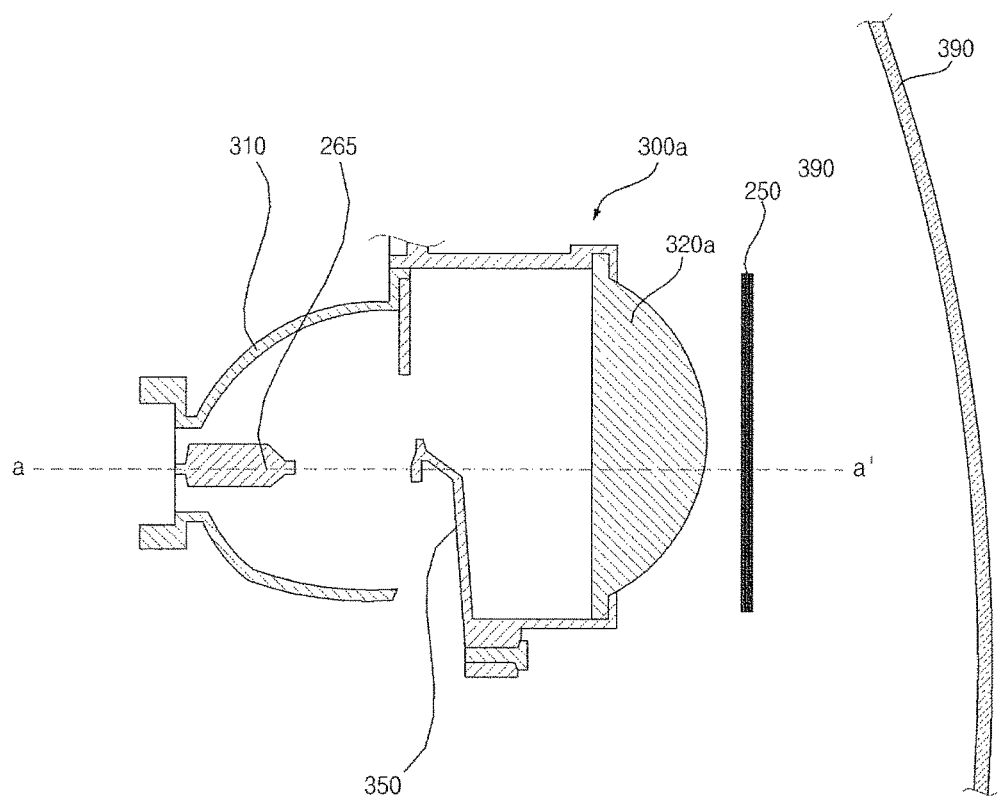
FIGS. 3A, 3B, and 3C are diagrams illustrating an example of a first type lamp module.
Figure 3B:
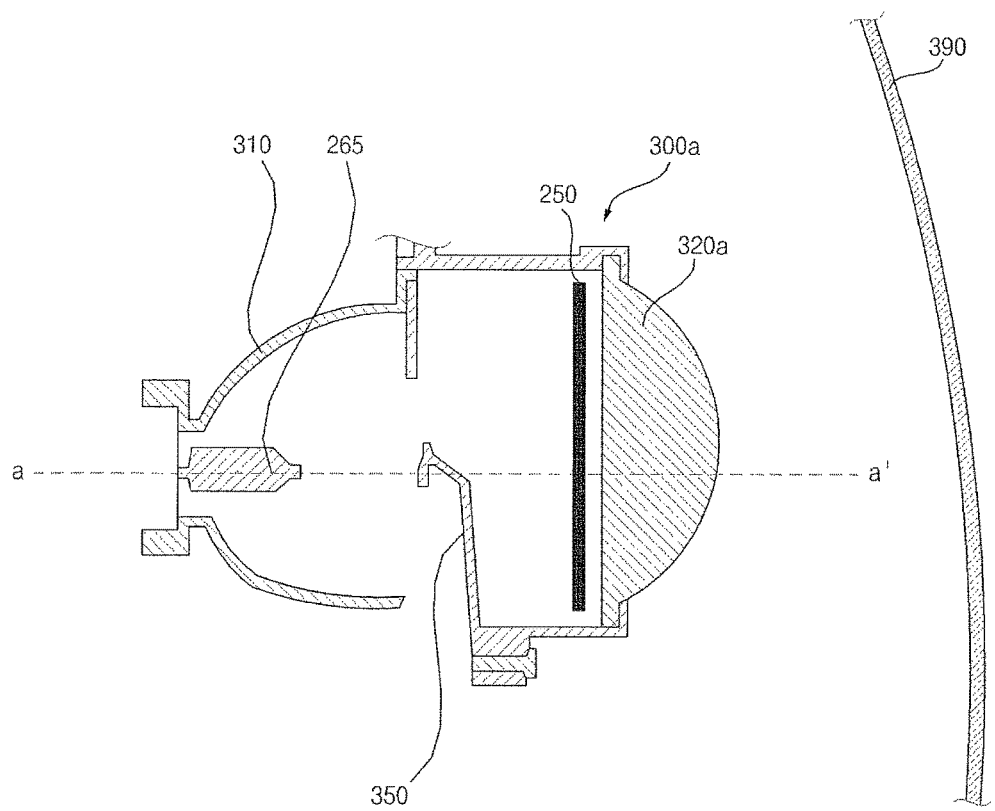
Figure 3C:
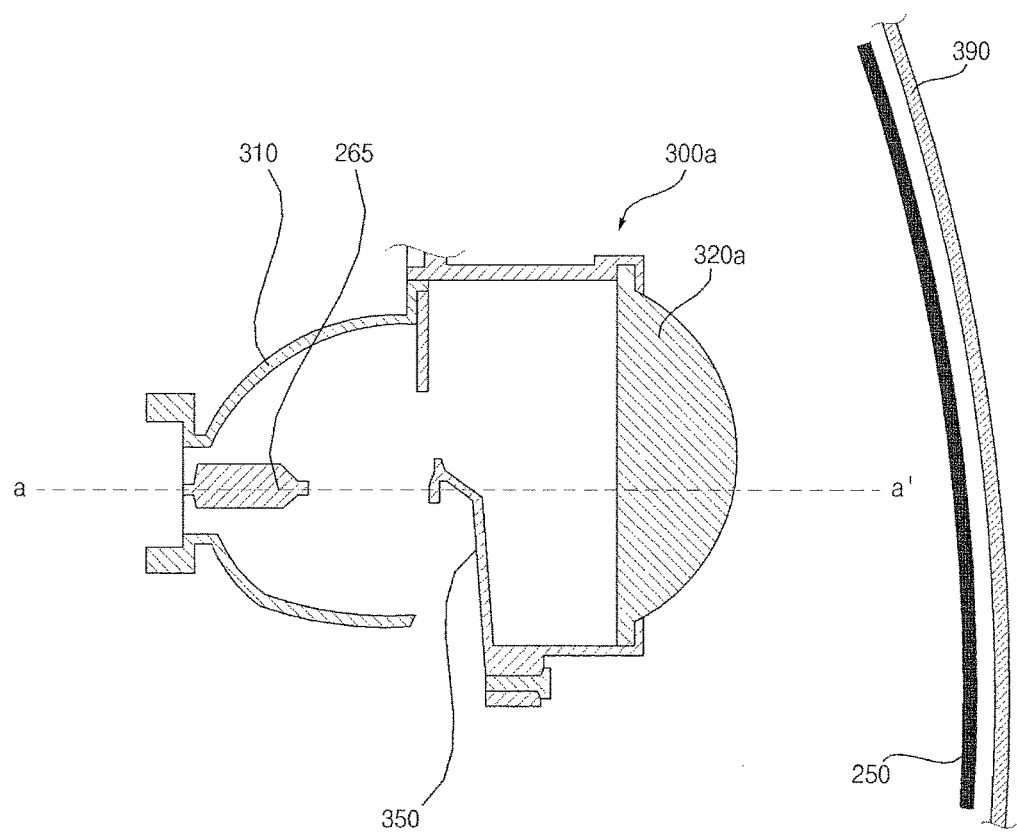
Figure 3D:
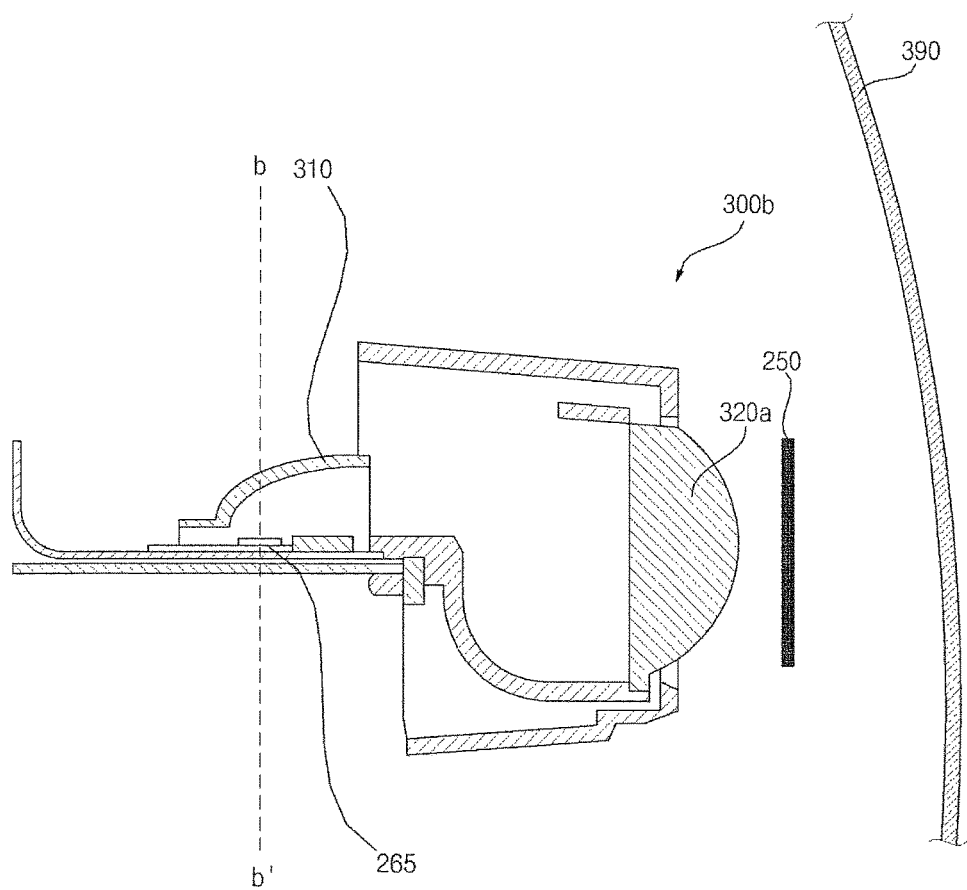
FIGS. 3D, 3E, and 3F are diagrams illustrating an example of a second type lamp module.
Figure 3E:
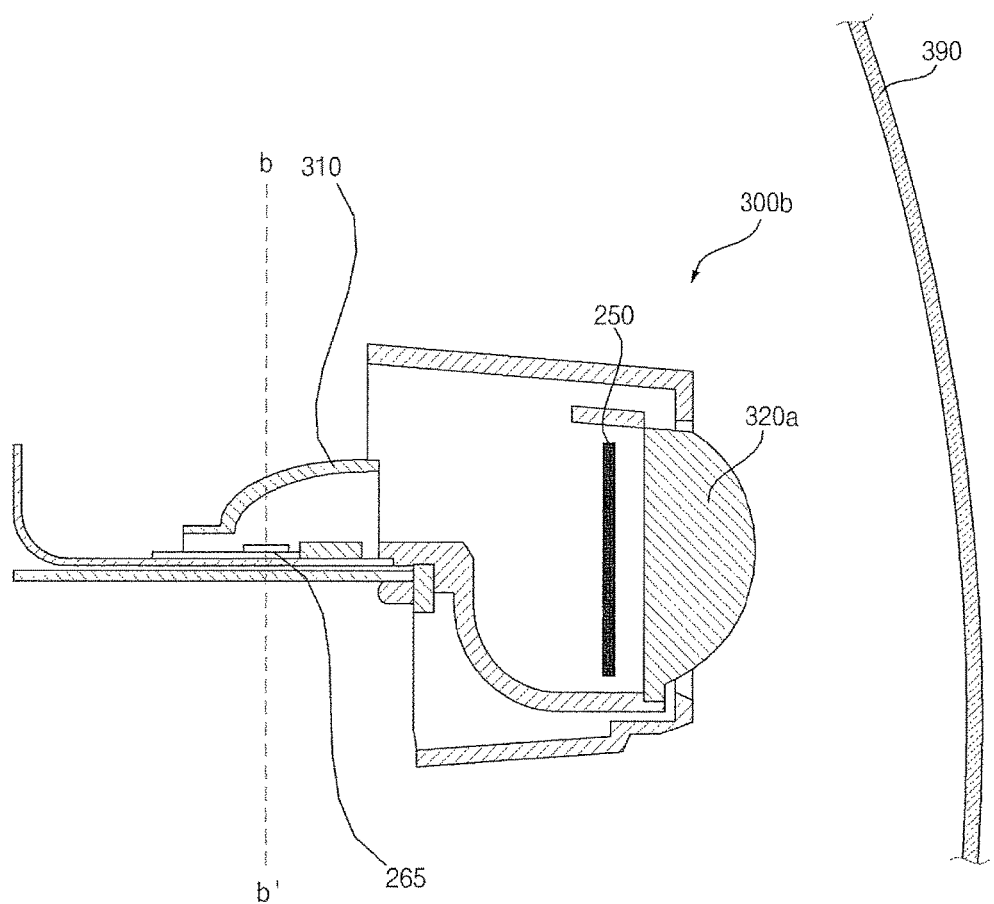
Figure 3F:
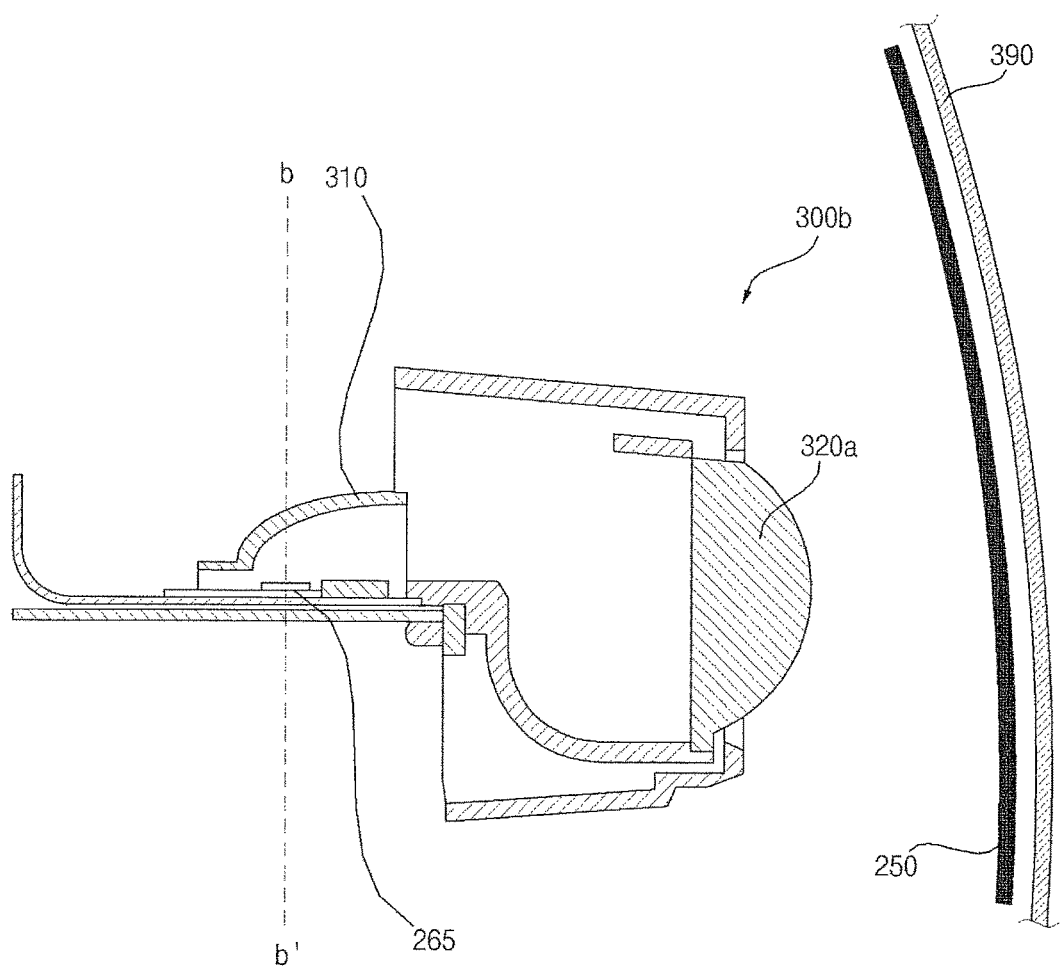
Figure 4:
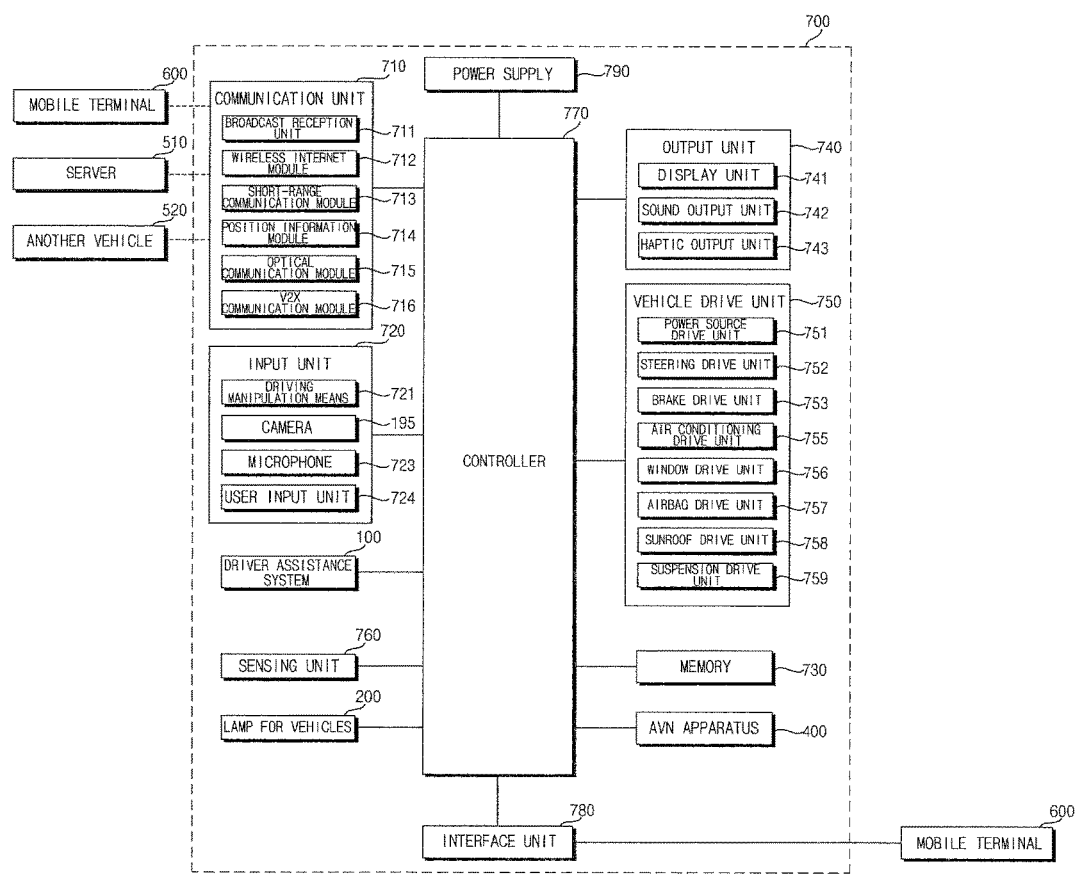
FIG. 4 is a block diagram illustrating an example vehicle.

The lamp module 300 may include a drive unit 267, a light source 265, a light source position adjustment unit 268, a reflector 310 (see FIGS. 3A to 3D), and a lens 320 (see FIGS. 3 to 4).

The drive unit 267 may control the light source 265 according to a control signal from the processor 170. Specifically, the drive unit 267 applies a drive current to the light source 265 according to the control signal. Light emitted from the light source 265 may be controlled according to the drive current applied by the drive unit 267.

The drive unit 267 may operate based on a control signal received from the processor 270.

The light source 265 may generate light. The light source 265 may convert electric energy into light energy. The light source 265 may include one of a metal filament lamp, a halogen bulb, a high-intensity discharge (HID) lamp, a neon gas discharge lamp, a light emitting diode (LED) lamp and a laser diode.

The light source position adjustment unit 268 may adjust the position of the light source 265. The light source position adjustment unit 268 may include a light source position adjustment drive unit for generating driving force for adjusting the position of the transparent display 250 and a connector for connecting the transparent display 250.

The light source position adjustment unit 268 may operate based on a control signal received from the processor 270.

The light source position adjustment drive unit may include a power generation unit capable of generating power such as a motor, an actuator, and a solenoid.

The connector may include a driving power transmission unit such as a gear which is capable of transmitting driving power generated by the position adjustment drive unit to the transparent display 250.

The reflector 310 (see FIGS. 3A to 3F) and the lens 320 (see FIG. 3A to 3F) will be described with reference to FIGS. 3 and 4.

The transparent display 250 may allow a part or the entire of light generated by the light source 265 to be transmitted therethrough.

When the transparent display 250 is not used a display, it may remain transparent. In this case, the transparent display 250 may allow light generated by the light source 265 to be transmitted therethrough.

The transparent display 250 may operate based on a control signal received from the processor 270.

One area of the transparent display 250 may be controlled and darkened by the processor 270. One area of the transparent display 250 may be controlled and dimmed by the processor 270.

For example, one area of the transparent display 250 corresponding to a vehicle traveling in the opposite lane may be darkened. In particular, one area of the transparent display 250 corresponding to the windshield of the vehicle traveling in the opposite lane may be darkened. In particular, one area of the transparent display 250 corresponding to a part of the windshield of the vehicle traveling in the opposite lane at which the face of the driver of the vehicle traveling in the opposite lane is located may be darkened.

For example, if there is a plurality of vehicles traveling in the opposite lane, areas of the transparent display 250 corresponding to the respective windshields of the vehicles traveling in the opposite lane may be darkened.

For example, one area of the transparent display 250 corresponding to a foregoing vehicle may be darkened. In particular, one area of the transparent display 250 corresponding to at least one of a rear windshield, side-view mirrors and a rearview mirror may be darkened.

For example, if there is a plurality of foregoing vehicles, each area of the transparent display 250 corresponding to at least one of a rear windshield, side-view mirrors and a rearview mirror of each foregoing vehicle may be darkened.

For example, one area of the transparent display 250 corresponding to the face of a pedestrian may be darkened.

Predetermined content may be displayed in one area of the transparent display 250. The content may come in various colors and brightnesses. When light is transmitted through the transparent display 250 having content displayed thereon, the light transmitted through an area of the transparent display 250 in which the content displayed may come in a different color and different brightness over the light transmitted through another area of the display in which the content is not displayed. According to this principle, if light is projected through the transparent display 250 with predetermined information displayed on the transparent display 250, the predetermined information may be displayed on a projection surface.

A pattern may be created in one area of the transparent display 250 based on a difference in brightness or color. In some implementations, the pattern may be created based on the difference in brightness or color between a first area and second area of the transparent display 250.

The transparent display 250 employs transparent electronic devices having a predetermined transmissivity.

The transparent display 250 may be divided into a projection view-type transparent display and a direct view-type transparent display.

The transparent display 250 may include one of a transparent TFEL, transparent OLED, transparent LCD, transparent PDP, transparent LED and transparent AMOLED.

If the vehicle 700 is provided with a plurality of lamps, a plurality of transparent displays 250 corresponding to the number of the lamps may be provided. In some implementations, the transparent display 250 may be provided to only one lamp. For example, the vehicle 700 generally includes two headlamps. In this case, each of the headlamps may include the transparent display 250. In some implementations, only one of the headlamps may include the transparent display 250.

If one headlamp includes a plurality of headlamp modules 300, a plurality of transparent displays 250 corresponding to the headlamp modules 300 respectively may be provided. In some implementations, the transparent displays 250 may be provided to only one headlamp module 300. For example, if a first headlamp includes a plurality of headlamp modules 300, a plurality of transparent displays 250 corresponding to the headlamp modules 300 respectively may be provided. In some implementations, the transparent displays 250 may be provided to only the first headlamp module among the plurality of headlamp modules.

The transparent display 250 may have a shape corresponding to a beam pattern of light generated by the light source 265, light reflected by the reflector 310 (see FIGS. 3A to 3F), or light transmitted through the lens 320 (see FIGS. 3A to 3F). For example, if the beam pattern is circular, the transparent display 250 may have a circular shape. In some implementations, if the beam pattern is rectangular, the transparent display 250 may have a rectangular shape.

The transparent display 250 may be controlled by the processor 270. In some implementations, the transparent display 250 may be controlled by a controller 770 of the vehicle 700.

The position adjustment unit 255 may adjust the position of the transparent display. The position adjustment unit 255 the transparent display 250 may include a position adjustment drive unit for generating driving force for adjusting the position of the transparent display 250 and a connector for connecting the transparent display 250.

The position adjustment unit 255 may operate based on a control signal received from the processor 270.

The position adjustment drive unit may include a power generation unit capable of generating power such as a motor, an actuator, and a solenoid.

The connector may include a driving power transmission unit such as a gear which is capable of transmitting driving power generated by the position adjustment drive unit to the transparent display 250.

The processor 270 may be configured to control overall operation of each unit in the headlamp 200.

The processor 270 may be configured to control the position adjustment unit 255 to adjust the position of the transparent display 250.

In some implementations, the processor 270 may be configured to control the light source position adjustment unit 268 to adjust the position of the light source 265.

The processor 270 may be configured to control the transparent display 250 to darken one area of the transparent display 250 corresponding to an object.

The processor 270 may be configured to control the transparent display 250 to dim one area of the transparent display 250 corresponding to the object.

The processor 270 may be configured to darken one area of the transparent display 250 corresponding to the object such that the area has a color or brightness different from that of the other area.

In some implementations, information about the object may be received from the adaptive driver assistance system 100 through the interface unit 280.

The object may be a vehicle traveling in the opposite lane, a foregoing vehicle or a pedestrian.

The vehicle traveling in the opposite lane may be a vehicle traveling in a direction facing the vehicle 700. There may be a plurality of vehicles traveling in the opposite lane.

The foregoing vehicle may be a vehicle traveling in the same direction as the vehicle 700. There may be a plurality of foregoing vehicles. The foregoing vehicle may be a vehicle traveling on the lane on which the vehicle 700 is traveling or a vehicle traveling on a lane next to the lane of the vehicle 700.

The processor 270 may be configured to perform a control operation to gradually darken one area of the transparent display 250 corresponding to the object in proportion to the distance to the object.

The processor 270 may be configured to receive information on the distance to the object from the adaptive driver assistance system 100 through the interface unit 280.

As the distance to the object decreases, the intensity of light emitted from the headlamp onto the object increases. By gradually darkening the one area in proportion the distance to the object, glare to the counterpart (e.g., the driver of a vehicle traveling in the opposite lane or a foregoing vehicle or a pedestrian) may be prevented, and a sufficiently clear view may be secured for the driver of the vehicle 700.

The processor 270 may be configured to change one area of the display 250 corresponding to the object in response to change in relative location of the object.

The processor 270 may be configured to receive information about change in relative location of the object from the adaptive driver assistance system 100 through the interface unit 280.

When the vehicle 700 runs, the object may also moves. The relative location of the object may change according to relative movement of the vehicle 700 and the object as time passes. In this case, one area of the display 250 corresponding to the object may be changed in response to change in relative location of the object. Thereby, the counterpart (e.g., the driver of a vehicle traveling in the opposite lane or a foregoing vehicle or a pedestrian) may be prevented from being exposed to glare, and a sufficiently clear view may be secured for the driver of the vehicle 700.

The processor 270 may be configured to adjust the size of one area of the display 250 corresponding to the object in response to change in the relative size of the object.

The processor 270 may be configured to receive information about change in the relative size of the object from the adaptive driver assistance system 100 through the interface unit 280.

As the object comes close to the vehicle 700, the relative size of the object may change with time. In this case, one area of the display 250 corresponding to the object may be changed in response to change in the relative size of the object. Thereby, glare to the counterpart (e.g., the driver of a vehicle traveling in the opposite lane or a foregoing vehicle or a pedestrian) may be prevented, and a sufficiently clear view may be secured for the driver of the vehicle 700.

If the object is a vehicle traveling in the opposite lane, the processor 270 may be configured to perform a control operation to darken one area of the transparent display 250 corresponding to the windshield of the vehicle traveling in the opposite lane. In particular, the processor 270 may be configured to perform a control operation to darken one area of the transparent display 250 corresponding to a part of the windshield of the vehicle traveling in the opposite lane on which the face of the driver of the vehicle traveling in the opposite lane is located.

If there is a plurality of vehicles traveling in the opposite lane, the processor 270 may be configured to perform a control operation to darken areas of the transparent display 250 corresponding to the respective windshields of the vehicles traveling in the opposite lane.

The processor 270 may be configured to receive information about the windshield of a vehicle traveling in the opposite lane from the adaptive driver assistance system 100 through the interface unit 280.

By darkening one area of the display 250 corresponding to the windshield of the vehicle traveling in the opposite lane rather than the whole area thereof, the driver of the vehicle traveling in the opposite lane may be prevented from being exposed to glare, and a maximum clear view may be secured for the driver of the vehicle 700.

If the object is a foregoing vehicle, the processor 270 may be configured to perform a control operation to darken one area of the transparent display 250 corresponding to at least one of the rear windshield, side-view mirrors and rearview mirror of the foregoing vehicle.

If there is a plurality of foregoing vehicles, the processor 270 may be configured to perform a control operation to darken each area of the transparent display 250 corresponding to at least one of a rear windshield, side-view mirrors and a rearview mirror of each foregoing vehicle.

The processor 270 may be configured to receive information about at least one of a rear windshield, side-view mirrors and a rearview mirror of the foregoing vehicle from the adaptive driver assistance system 100 through the interface unit 280.

By darkening one area of the display 250 corresponding to at least one of the rear windshield, side-view mirrors and rearview mirror of the foregoing vehicle rather than to the whole area of the foregoing vehicle, glare to the driver of the foregoing vehicle may be prevented, and a maximum clear view may be secured for the driver of the vehicle 700.

If the object is a pedestrian, the processor 270 may be configured to perform a control operation to darken one area of the transparent display 250 corresponding to the face of the pedestrian.

The processor 270 may be configured to receive information about the face of a pedestrian from the adaptive driver assistance system 100 through the interface unit 280.

By darkening one area of the display 250 corresponding to the face of the pedestrian rather than the whole area of the pedestrian, the pedestrian may be prevented from being exposed to glare, and a sufficiently clear view may be secured for the driver of the vehicle 700.

The processor 270 may be configured to receive curve, uphill road or downhill road information about a driving lane from the adaptive driver assistance system 100 or the sensing unit 760 through the interface unit.

When the position of the light source 265 is changed in response to curve, uphill road or downhill road information, the processor 270 may perform a control operation to darken one area of the transparent display 250 corresponding to an object in response to change in the position of the light source 265.

The processor 270 may be configured to output a control signal to the drive unit 267 to control the operation or state of the light source 265.

The processor 270 may be controlled by the controller 770.

The processor 270 may be implemented as hardware using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

The interface unit 280 may exchange date with the controller 770, sensing unit 760 or adaptive driver assistance system 100 of the vehicle 700.

The interface unit 280 may receive vehicle-related data or user inputs or transmit, to the outside, a signal processed or generated by the processor 270. To this end, the interface unit 280 may perform data communication with the controller 770, the sensing unit 760, or the adaptive driver assistance system 100 provided in the vehicle in a wired or wireless manner.

The interface unit 280 may receive sensor information from the controller 770 or the sensing unit 760.

In some implementations, the sensor information may include at least one of vehicle direction information, vehicle location information (GPS information), vehicle orientation information, vehicle speed information, vehicle acceleration information, vehicle inclination information, vehicle drive/reverse information, battery information, fuel information, tire information, vehicular headlamp information, interior temperature information, and interior humidity information.

Such sensor information may be acquired from a heading sensor, a yaw sensor, a gyro sensor, a position module, a vehicle drive/reverse drive sensor, a wheel sensor, a vehicle speed sensor, a vehicle body tilt sensor, a battery sensor, a fuel sensor, a tire sensor, a steering sensor based on turning of the steering wheel, an interior temperature sensor, and an interior humidity sensor. The position module may include a GPS module for receiving GPS information.

Among the pieces of sensor information, the vehicle direction information, vehicle location information, vehicle orientation information, vehicle speed information and vehicle inclination information, which are related to traveling of the vehicle, may be called vehicle travel information.

The interface unit 280 may receive user gaze information acquired by the internal camera 195c (see FIG. 4).

Meanwhile, the interface unit 280 may receive, from the controller 770 or the adaptive driver assistance system 100, object information detected by the adaptive driver assistance system 100.

The adaptive driver assistance system 100 may perform lane detection (LD), vehicle detection (VD), pedestrian detection (PD), bright spot detection (BD), traffic sign recognition (TSR), and road surface detection, based on an acquired image. The adaptive driver assistance system 100 may generate information about a distance to a detected object.

The interface unit 280 may receive the detected object information from the adaptive driver assistance system 100. In some implementations, the interface unit 280 may receive the detected object information via the controller 770.

The interface unit 280 may receive information about a distance to the object from the adaptive driver assistance system 100.

The interface unit 280 may receive information about change in relative position of the object from the adaptive driver assistance system 100.

The interface unit 280 may receive information about change in relative size of the object from the adaptive driver assistance system 100.

The interface unit 280 may receive information about the windshield of a vehicle traveling in the opposite lane from the adaptive driver assistance system 100. In particular, the interface unit 280 may receive, from the adaptive driver assistance system 100, information about a part of the windshield of the vehicle traveling in the opposite lane at which the face of the driver of the vehicle traveling in the opposite lane is located. In some implementations, the part of the windshield of the vehicle traveling in the opposite lane at which the face of the driver of the vehicle traveling in the opposite lane is located may correspond to a windshield area close to the driver's seat in the vehicle traveling in the opposite lane.

The interface unit 280 may receive information about at least one of a rear windshield, side-view mirrors and a rearview mirror of a foregoing vehicle from the adaptive driver assistance system 100.

The interface unit 280 may receive information about the face of a pedestrian from the adaptive driver assistance system 100.

The interface unit 280 may receive drive lane information. The drive lane information may be acquired by computer-processing a lane detected through the adaptive driver assistance system 100.

The interface unit 280 may receive curve, uphill road or downhill road information about a road on which the vehicle is traveling.

The controller 770 may determine presence of a curve of a road based on the steering wheel rotation information or the position information about the vehicle 200 (e.g., vehicle orientation information, vehicle inclination information).

The adaptive driver assistance system 100 may determine presence of a curve of a road in a front view image of the vehicle acquired through the camera 195.

The controller 770 may determine whether the road is an uphill road or a downhill road based on the inclination information about the vehicle 700.

The adaptive driver assistance system 100 may determine whether the road is an uphill road or a downhill road in a front view image of the vehicle acquired through the camera 195.

The interface unit 280 may receive forward objects information, rearward objects information, navigation information, road information, vehicle condition information, vehicle driving information, in-vehicle situation information or driving environment information.

The interface unit 280 may receive navigation information through data communication with the controller 770, a display apparatus 400 or a separate navigation device (not shown). In some implementations, the navigation information may include predetermined destination information, route information according to the destination, map information, and current location information, wherein the map information and the current location information are related to traveling of the vehicle. The navigation information may include information about the location of the vehicle on the road.

The interface unit 280 may receive a user input that is input through the input unit 720 of the vehicle 700.

The adaptive driver assistance system 100 will be described in more detail with reference to FIGS. 5 to 7C.

The power supply 290 may be controlled by the processor 270 to supply electric power necessary for operation of each unit of the headlamp 200. In particular, the power supply 290 may receive power from, for example, a battery in the vehicle 700.

FIGS. 3A to 3C are views illustrating a first type headlamp module. FIGS. 3D to 3F are views illustrating a second type headlamp module.

Hereinafter, description will be given of the first and second type headlamp modules in terms of structure with reference to FIGS. 3A to 3F. The first and second type headlamp modules may be included in a headlamp.

A headlamp module 300a, 300b may include a light source 265, a reflector 310 and a lens 320a.

The light source 265 may generate light. The light generated by the light source 265 may be emitted directly forward of the vehicle or may be reflected by the reflector 310 and emitted forward of the vehicle.

The reflector 310 may reflect and guide the light generated by the light source 265 such that the light is emitted forward of the vehicle 700. The reflector 310 may be formed of aluminum (Al) or silver (Ag), which has good reflectivity, or may be coated onto a surface for reflecting light.

For the first type headlamp module (see FIGS. 3A to 3C), an optical axis a-a' is formed in the front-to-back direction of the vehicle, and the reflector 310 reflect light emitted in directions other than the forward direction to guide the light forward.

If the first type headlamp module 300a (see FIGS. 3A to 3C) generates a low beam, the headlamp module 300a includes a light shield cap 350, which prevent light from being emitted upward. If the first type headlamp module (see FIG. 3) generates a high beam, the headlamp module 300a does not include the light shield cap 350.

For the second type headlamp module 300b (see FIGS. 3D to 3F), an optical axis b-b' is formed in a direction perpendicular to the front-to-back direction of the vehicle, and the reflector 310 reflects light emitted from the light source 265 to guide the light forward.

The lens 320a is disposed in front of the light source 265 and the reflector 310. The lens 320a causes light emitted from the light source 265 or reflected from the reflector 310 to be refracted and transmitted therethrough. The lens 320a may include an aspheric lens.

Light passing through the reflector 310 may be transmitted through the aspheric lens 320a, thereby traveling straight forward of the vehicle 700. The lens 320a may be formed of transparent glass or plastics.

In some implementations, the headlamp module 300a, 300b may not include the lens 320a.

The headlamp 200 may further include an outer lens 390. The outer lens 390 covers the opening of a housing defining the exterior of the headlamp. The outer lens 390 may be disposed in front of the light source 265, the reflector 310, and the lens 320a. The outer lens 390 may be formed of transparent plastics or glass. Preferably, the outer lens 390 is generally formed of an ALDC plastic material having excellent thermal conductivity.

The headlamp 200 may include the transparent display 250.

As shown in FIGS. 3A and 3D, the transparent display 250 may be disposed in front of the lens 320a. The transparent display 250 may be disposed between the lens 320a and the outer lens 390. In this case, the transparent display 250 may be disposed closer to the lens 320a than to the outer lens 390. For example, the transparent display 250 may be disposed to contact a part or the entirety of one surface of the lens 320a facing forward of the vehicle. In this case, light generated by the light source 265 or reflected from the reflector 310 may be transmitted through the lens 320a, and the light transmitted through the lens 320a may be emitted outward through the transparent display 250. As shown in FIGS. 3B and 3E, the transparent display 250 may be disposed behind the lens 320a. The transparent display 250 may be disposed between the lens 320a and the light source 265. In this case, the transparent display 250 may be disposed closer to the lens 320a than to the light source 265. For example, the transparent display 250 may be disposed to contact a part or the entirety of one surface of the lens 320a facing rearward of the vehicle. In this case, light generated by the light source 265 or reflected from the reflector 310 may be transmitted through the transparent display 250, and the light transmitted through the transparent display 250 may be emitted outward through the lens 320a.

Meanwhile, a plurality of lenses 320b may be provided depending on the number of light sources 265. In this case, one or more transparent displays 250 may be provided.

As shown in FIGS. 3C and 3F, the transparent display 250 may be disposed behind the outer lens 390. The transparent display 250 may be disposed between the outer lens 390 and the light source 265. The transparent display 250 may be disposed closer to the outer lens 390 than to the light source 265. For example, the transparent display 250 may be disposed to contact a part or the entirety of one surface of the outer lens 390 facing rearward of the vehicle.

The transparent display 250 may be disposed such that information is readily displayed on the projection surface. For example, the transparent display 250 may be disposed perpendicular to the direction in which the vehicle travels. In some implementations, the transparent display 250 may be disposed to form a predetermined angle with respect to the direction in which the vehicle travels.

FIG. 4 illustrates an example vehicle.

Referring to FIG. 4, the vehicle 700 may include a communication unit 710, an input unit 720, a sensing unit 760, an output unit 740, a vehicle drive unit 750, a memory 730, an interface unit 780, a controller 770, a power supply 790, an adaptive driver assistance system 100, a headlamp 200 for vehicles and a display apparatus 400.

The communication unit 710 may include at least one module enabling wireless communication between the vehicle 700 and the mobile terminal 600, between the vehicle 700 and the external server 510 or between the vehicle 700 and another vehicle 520. The communication unit 710 may also include at least one module for connecting the vehicle 700 to at least one network.

The communication unit 710 may receive traffic accident information, construction information or road congestion information from the external devices 600, 510 and 520. For example, the communication unit 710 may receive traffic accident information, construction information or road congestion information through the wireless Internet module 712.

The communication unit 710 may include a broadcast reception module 711, the wireless Internet module 712, the short-range communication module 713, the location information module 714, an optical communication module 715 and a V2X communication module 716.

The broadcast reception module 711 receives a broadcast signal or broadcast-related information from an external broadcast management server over a broadcast channel. In some implementations, the broadcast includes radio broadcast or TV broadcast.

The wireless Internet module 712, which refers to a module for wireless Internet access, may be internally or externally installed on the vehicle 700. The wireless Internet module 712 is configured to transmit and receive a radio signal on a communication network according to wireless Internet technologies.

Examples of wireless Internet technologies include Wireless LAN (WLAN), Wi-Fi, Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless Internet module 712 transmits and receives data according to at least one wireless Internet technology selected from among wireless Internet technologies including the aforementioned technologies. For example, the wireless Internet module 712 may wirelessly exchange data with the external server 510. The wireless Internet module 712 may receive weather information and traffic situation information (e.g., TPEG (Transport Protocol Expert Group)) from the external server 510.

The short-range communication module 713, which is intended for short-range communication, may support short-range communication using at least one of Bluetooth™, Radio Frequency Identification (RFID), Infrared Data Association (IrDA), Ultra Wideband (UWB), ZigBee, Near Field Communication (NFC), Wi-Fi, Wi-Fi Direct, and Wireless Universal Serial Bus (Wireless USB) technologies.

The short-range communication module 713 may establish a wireless local area network to implement short-range communication between the vehicle 700 and at least one external device. For example, the short-range communication module 713 may wirelessly exchange data with the mobile terminal 600. The short-range communication module 713 may receive weather information, and traffic situation information (e.g., TPEG (Transport Protocol Expert Group)) from the mobile terminal 600. For example, when a user enters the vehicle 700, the mobile terminal 600 of the user may be paired with the vehicle 700 automatically or by execution of an application by the user.

A typical example of the location information module 714, which serves to acquire the location of the vehicle 700, is a global positioning system (GPS) module. For example, if the vehicle utilizes the GPS module, the location of the vehicle may be acquired using a signal sent from a GPS satellite.

The optical communication module 715 may include a light transmitter and a light receiver.

The light receiver may covert a light signal to an electrical signal to receiver information. The light receiver may include a photodiode (PD) for receiving light. The PD is capable of converting light into an electrical signal. For example, the light receiver may receive information on a foregoing vehicle through light emitted from a light source included in the foregoing vehicle.

The light transmitter may include at least one light emitting device for converting an electrical signal to a light signal. Preferably, the light emitting device is a light emitting diode (LED). The light transmitter converts an electrical signal into a light signal and transmits the light signal outside. For example, the light transmitter transmits a light signal by blinking a light emitting device at a predetermined frequency. In some implementations, the light transmitter may include an array of a plurality of light emitting devices. In some implementations, the light transmitter may be integrated with a lamp provided to the vehicle 700. For example, the light transmitter may be at least one of a headlight, a taillight, a stop lamp, a turn signal lamp and a sidelight. For example, the optical communication module 715 may exchange data with another vehicle 520 through optical communication.

The V2X communication module 716 is a module for performing wireless communication with the server 510 or another vehicle 520. The V2X communication module 716 includes a module capable of implementing a vehicle-to-vehicle (V2V) communication protocol or a vehicle-to-infrastructure (V2I) communication protocol. The vehicle 700 may perform wireless communication with the external server 510 and another vehicle 520 through the V2X communication module 716.

The input unit 720 may include a driving manipulation unit 721, a camera 195, a microphone 723 and a user input unit 724.

The driving manipulation unit 721 receive a user input for driving the vehicle 700. The driving manipulation unit 721 may include a steering input unit 721a, a shift input unit 721b, an acceleration input unit 721c, and a brake input unit 721d.

The steering input unit 721a receives a travel direction input of the vehicle 700 from the user. The steering input unit 721a is preferably formed in the shape of a wheel such that steering can be input by a turning operation. In some implementations, the steering input unit 721a may be defined in the form of a touchscreen, touch pad, or button.

The shift input unit 721b receives, from the user, inputs of Park (P), Drive (D), Neutral (N) and Reverse (R) of the vehicle 700. Preferably, the shift input unit 721b is formed in the shape of a lever. In some implementations, the shift input unit 721b may be defined in the form of a touchscreen, touch pad, or button.

The acceleration input unit 721c receives an input for accelerating the vehicle 700 from the user. The brake input unit 721d receives an input for decelerating the vehicle 700 from the user. Preferably, the acceleration input unit 721c and the brake input unit 721d are formed in the shape of a pedal. In some implementations, the acceleration input unit 721c or the brake input unit 721d may have the form of a touchscreen, touch pad, or button.

The camera 195 may include an image sensor and an image processing module. The camera 195 may process a still image or a moving image obtained by the image sensor (e.g., CMOS or CCD). The image processing module may process the still image or moving image acquired through the image sensor to extract necessary information and deliver the extracted information to the controller 770. Meanwhile, the vehicle 700 may include a camera 195 for capturing an image of a front view or surroundings of the vehicle and an internal camera 195c for capturing an image of the inside of the vehicle.

The internal camera 195c may acquire an image of a person on board. The internal camera 195c may obtain an image for biometric identification of the person.

While FIG. 4 illustrates the camera 195 as being included in the input unit 720, the camera 195 may be included in the adaptive driver assistance system 100.

The microphone 723 may process an external sound signal to create electrical data. The data created through processing may be utilized for various purposes according to a function in execution in the vehicle 700. The microphone 723 may convert a voice command from the user into electrical data. The electrical data may be delivered to the controller 770.

In some implementations, the camera 722 or the microphone 723 may be included in the sensing unit 760 rather than in the input unit 720.

The user input unit 724 is intended to receive information input by the user. When information is input through the user input unit 724, the controller 770 may control operation of the vehicle 700 in accordance with the input information. The user input unit 724 may include a touch input unit or a mechanical input unit. In some implementations the user input unit 724 may be disposed in one area of the steering wheel. In this case, the driver may manipulate the user input unit 724 with fingers while holding the steering wheel.

The sensing unit 760 senses a signal related to traveling of the vehicle 700. To this end, the sensing unit 760 may include a collision sensor, a wheel sensor, a speed sensor, a tilt sensor, a weight sensor, a heading sensor, a yaw sensor, a gyro sensor, a position module, a vehicle drive/reverse sensor, a battery sensor, a fuel sensor, a tire sensor, a steering sensor based on turning of the steering wheel, an interior temperature sensor, an interior humidity sensor, an ultrasonic sensor, radar, and lidar.

Thereby, the sensing unit 760 may acquire vehicle collision information, vehicle direction information, vehicle location information (GPS information), vehicle orientation information, vehicle speed information, vehicle acceleration information, vehicle inclination information, vehicle drive/reverse information, battery information, fuel information, tire information, vehicular headlamp information, interior temperature information, interior humidity information, and a sensing signal for an angle by which the steering wheel is rotated.

The sensing unit 760 may further include an accelerator pedal sensor, a pressure sensor, an engine speed sensor, an air flow sensor (AFS), an intake air temperature sensor (ATS), a water temperature sensor (WTS), a throttle position sensor (TPS), a TDC sensor, and a crankshaft angle sensor (CAS).

The sensing unit 760 may include a biometric identification information sensing unit. The biometric identification information sensing unit senses and acquires biometric identification information of a passenger. The biometric identification information may include fingerprint information, iris-scan information, retina-scan information, hand geometry information, facial recognition information, and voice recognition information. The biometric identification information sensing unit may include a sensor for sensing biometric identification information of a passenger. In some implementations, the internal camera 195c and the microphone 723 may operate as sensors. The biometric identification information sensing unit may acquire hand geometry information and facial recognition information through the internal camera 195c.

The output unit 740, which serves to output information processed by the controller 770, may include a display unit 741, a sound output unit 742 and a haptic output unit 743.

The display unit 741 may display information processed by the controller 770. For example, the display unit 741 may display vehicle-related information. In some implementations, the vehicle-related information may include vehicle control information for direction control of the vehicle or vehicle driving assistance information for assisting the driver in driving. The vehicle-related information may also include vehicle condition information indicating the current condition of the vehicle or vehicle driving information related to driving.

The display unit 741 may include at least one of a liquid crystal display (LCD), a thin film transistor-liquid crystal display (TFT LCD), an organic light-emitting diode (OLED), a flexible display, a 3D display, and an e-ink display.

The display unit 741 may form a layered architecture together with a touch sensor or be integrated with the touch sensor, thereby implementing a touchscreen. Such touchscreen may function as the user input unit 724 providing an input interface between the vehicle 700 and the user and also as an output interface between the vehicle 700 and the user. In this case, the display unit 741 may include a touch sensor for sensing touch applied to the display unit 741 in order to receive a control command in a touch manner. Thereby, when the display unit 741 is touched, the touch sensor may sense the touch, and the controller 770 may generate a control command corresponding to the touch. Content input through touch may include characters, numbers, or menu items which can be indicated or designated in various modes.

Meanwhile, the display unit 741 may include a cluster to allow a driver to check the vehicle condition information or vehicle driving information while driving the engine. The cluster may be positioned on the dashboard. In this case, the driver can check the information displayed on the cluster while looking forward of the vehicle.

In some implementations, the display unit 741 may be implemented as a head up display (HUD). If the display unit 741 is implemented as the HUD, information may be output through a transparent display provided to the windshield. In some implementations, the display unit 741 may be provided with a projection module, thereby, outputting information through an image projected onto the windshield.

In some implementations, the display unit 741 may include a transparent display. The transparent display may be attached to the windshield to provide predetermined information to the driver.

The sound output unit 742 converts an electrical signal from the controller 770 into an audio signal and outputs the audio signal. To this end, the sound output unit 742 may be provided with a speaker. The sound output unit 742 may output a sound corresponding to an operation of the user input unit 724.

The haptic output unit 743 generates a haptic output. For example, the haptic output unit 743 may vibrate the steering wheel, a seat belt and a seat to allow the user to recognize the output.

The vehicle drive unit 750 may control operation of various vehicular devices. The vehicle drive unit 750 may include a power source drive unit 751, a steering drive unit 752, a brake drive unit 753, a headlamp drive unit 754, an air conditioner drive unit 755, a window drive unit 756, an airbag drive unit 757, a sunroof drive unit 758 and a suspension drive unit 759.

The power source drive unit 751 may perform electronic control of the power source in the vehicle 700.

For example, if a fossil fuel-based engine is the power source, the power source drive unit 751 may perform electric control on the engine. Thereby, the output torque of the engine may be controlled. If the power source drive unit 751 is an engine, the output torque of the engine may be controlled by the controller 770 to limit the speed of the vehicle.

As another example, if an electricity-based motor is the power source, the power source drive unit 751 may perform control operation on the motor. Thereby, the rotational speed and torque of the motor may be controlled.

The steering drive unit 752 may perform electronic control of the steering apparatus in the vehicle 700. Thereby, the travel direction of the vehicle may be changed.

The brake drive unit 753 may perform electronic control of a brake apparatus in the vehicle 700. For example, by controlling the operation of the brakes disposed on the wheels, the speed of the vehicle 700 may be reduced. In another example, the brake disposed on a left wheel may be operated differently from the brake disposed on a right wheel in order to adjust the travel direction of the vehicle 700 to the left or right.

The air conditioner drive unit 755 may perform electronic control of an air conditioner in the vehicle 700. For example, if the temperature of the inside of the vehicle is high, the air conditioner drive unit 755 may control the air conditioner to supply cool air to the inside of the vehicle.

The window drive unit 756 may perform electronic control of a window apparatus in the vehicle 700. For example, the unit may control opening or closing of the left and right windows on both sides of the vehicle.

The airbag drive unit 757 may perform electronic control of an airbag apparatus in the vehicle 700. For example, the unit may control the airbag apparatus such that the airbags are inflated when the vehicle is exposed to danger.

The sunroof drive unit 758 may perform electronic control of a sunroof apparatus in the vehicle 700. For example, the unit may control opening or closing of the sunroof.

The suspension drive unit 759 may perform electronic control of a suspension apparatus in the vehicle 700. For example, when a road surface is uneven, the unit may control the suspension apparatus to attenuate vibration of the vehicle 700.

The memory 730 is electrically connected to the controller 770. The memory 730 may store basic data for each unit, control data for controlling operation of each unit, and input/output data. When implemented through hardware, the memory 730 may include various storage devices such as a ROM, RAM, EPROM, flash drive, and hard drive. The memory 730 may store various kinds of data for overall operation of the vehicle 700 including a program for processing or controlling operation of the controller 770.

The interface unit 780 may serve as a path between the vehicle 700 and various kinds of external devices connected thereto. For example, the interface unit 780 may be provided with a port connectable to the mobile terminal 600, and thus be connected to the mobile terminal 600 through the port. In this case, the interface unit 780 may exchange data with the mobile terminal 600.

The interface unit 780 may also serve as a path through which electrical energy is supplied to the mobile terminal 600 connected thereto. If the mobile terminal 600 is electrically connected to the interface unit 780, the interface unit 780 is controlled by the controller 770 to provide the mobile terminal 600 with electrical energy supplied from the power supply 790.

The controller 770 may control overall operations of the respective units in the vehicle 700. The controller 770 may be called an electronic control unit (ECU).

The controller 770 may be implemented as hardware using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

The power supply 790 may be controlled by the controller 770 to supply electric power necessary for operation of respective constituents. In particular, the power supply 790 may receive power from, for example, a battery in the vehicle.

The adaptive driver assistance system 100 may exchange data with the controller 770. Information or data from the adaptive driver assistance system 100 may be output to the controller 770. In some implementations, information or data from the adaptive driver assistance system 100 may be output to the headlamp 200.

The headlamp 200 may be the headlamp described above with reference to FIGS. 1 to 3F.

The display apparatus 400 may exchange data with the controller 770. A signal or data from the display apparatus 400 may be output to the controller 770. In some implementations, a signal or data from the display apparatus 400 may be output to the headlamp 200.

Figure 5:
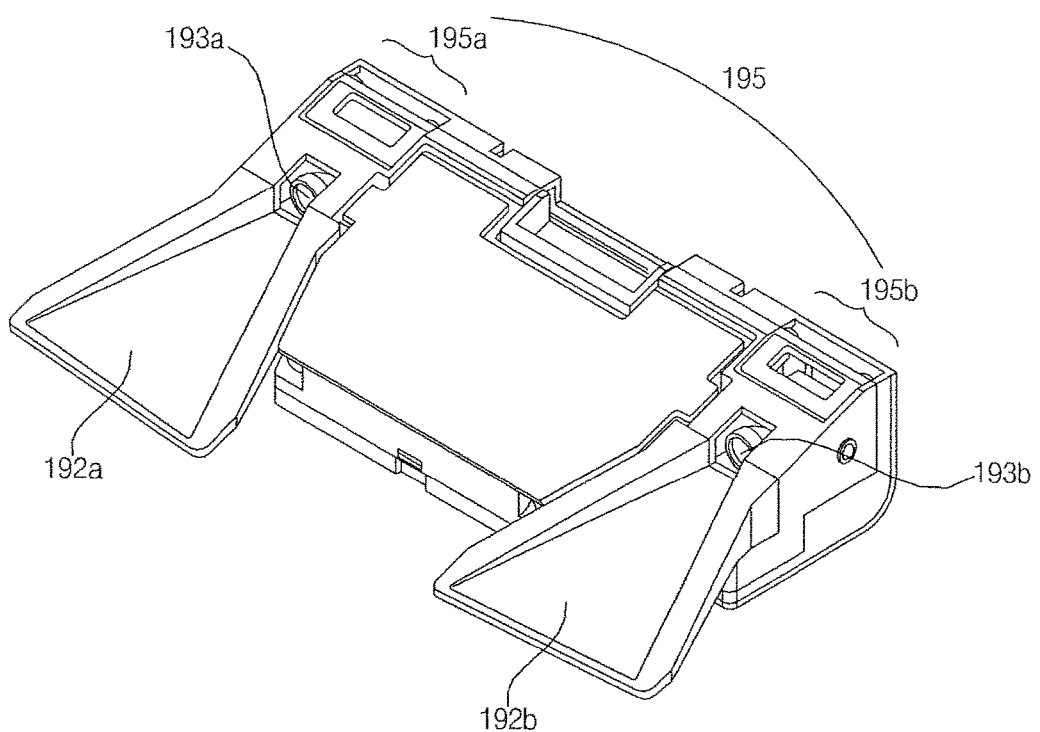
FIGS. 5, 6A, and 6B are diagrams illustrating example cameras attached to the vehicle of FIG. 1.
Figure 6A:
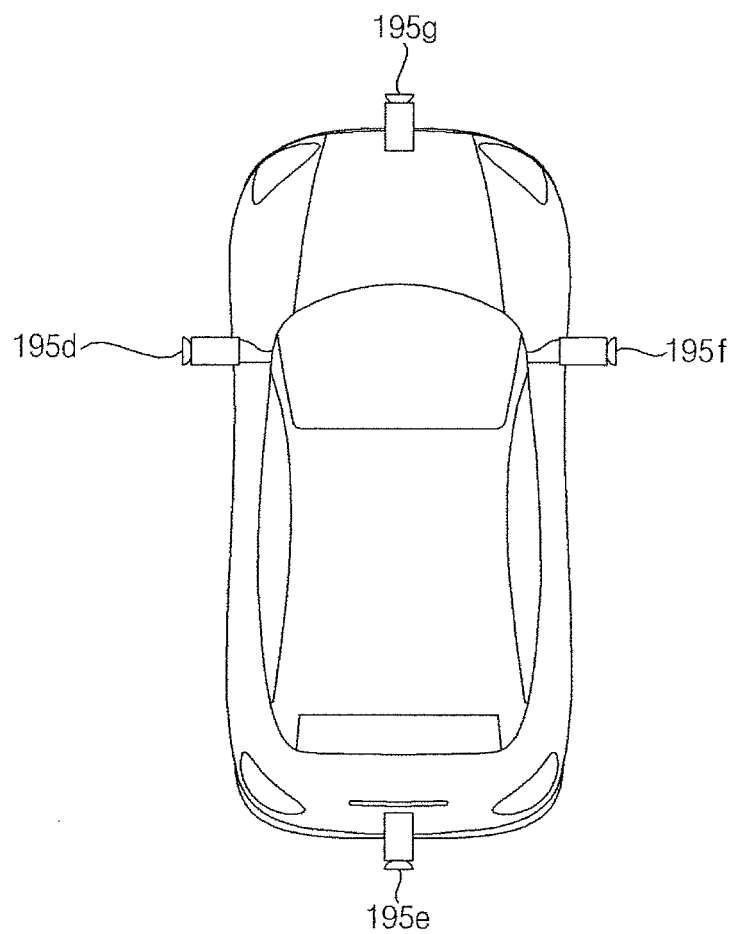
Figure 6B:
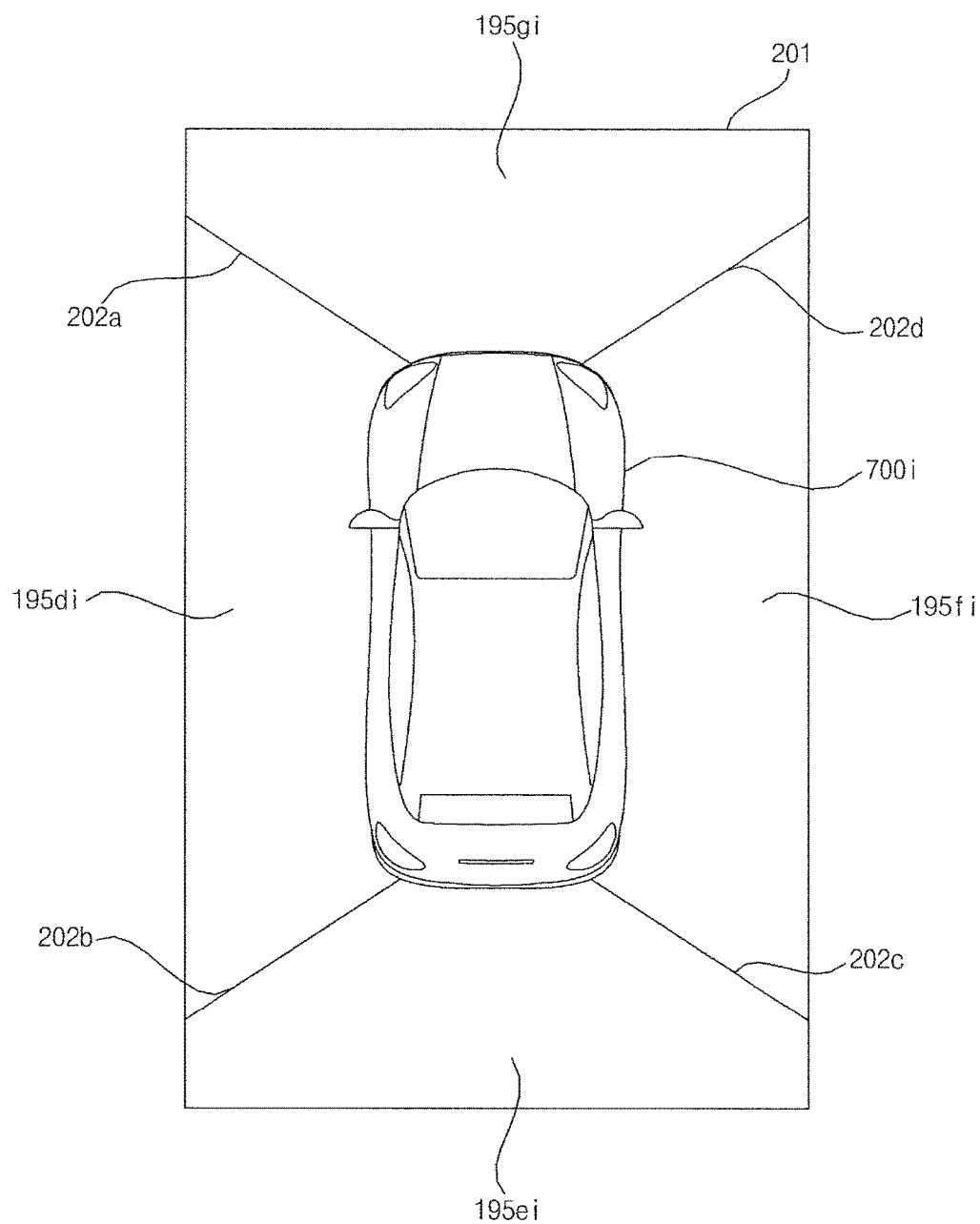

FIGS. 5 to 6B illustrate cameras attached to the vehicle of FIG. 1.

Hereinafter, description will be given of a driver assistance system including cameras 195a and 195b for acquiring an image of the front view of the vehicle, with reference to FIG. 5.

While the adaptive driver assistance system 100 is illustrated as including two cameras in FIG. 5, it is apparent that the number of cameras is not limited thereto.

Referring to FIG. 5, the adaptive driver assistance system 100 may include a first camera 195a provided with a first lens 193a and a second camera 195b provided with a second lens 193b. In this case, the camera 195 may be called a stereo camera.

The adaptive driver assistance system 100 may include a first light shield 192a and a second light shield 192b, which are intended to shield light incident on the first lens 193a and the second lens 193b, respectively.

The adaptive driver assistance system 100 shown in the figure may be detachably attached to the ceiling or windshield of the vehicle 700.

The adaptive driver assistance system 100 may acquire stereo images of the front view of the vehicle from the first and second cameras 195a and 195b, perform disparity detection based on the stereo images, perform object detection in at least one stereo image based on the disparity information, and continuously track movement of an object after the object detection.

Hereinafter, description will be given of a driving assistance system including cameras 195d, 195e, 195f and 195g for acquiring images of the surroundings of the vehicle with reference to FIGS. 6A and 6B.

While FIGS. 6A and 6B illustrate the adaptive driver assistance system 100 as including four cameras, it is apparent that the number of cameras is not limited thereto.

Referring to FIGS. 6A and 6B, the adaptive driver assistance system 100 may include a plurality of cameras 195d, 195e, 195f and 195g. In this case, the camera 195 may be called an around view camera.

The cameras 195d, 195e, 195f and 195g may be disposed at the left, back, right and front of the vehicle, respectively.

The left camera 195d may be disposed in a case surrounding the left side-view mirror. In some implementations, the left camera 195d may be disposed at the exterior of the case surrounding the left side-view mirror. In some implementations, the left camera 195d may be disposed in one outer area of the left front door, left rear door or left fender.

The right camera 195f may be disposed in a case surrounding the right side-view mirror. In some implementations, the right camera 195f may be disposed at the exterior of the case surrounding the right side-view mirror. In some implementations, the right camera 195f may be disposed at one outer area of the right front door, right rear door or right fender.

The rear camera 195e may be disposed near the rear license plate or trunk switch.

The front camera 195g may be disposed near the badge or radiator grille.

Images captured by the plurality of cameras 195d, 195e, 195f and 195g may be delivered to the processor 170, and the processor 170 may be configured to synthesize the images to generate an image of the surroundings of the vehicle.

FIG. 6B shows an exemplary image of the surroundings of the vehicle. A vehicle surroundings image 201 may include a first image area 195di of an image captured by the left camera 195d, a second image area 195ei of an image captured by the rear camera 195e, the third image area 195fi of an image captured by the right camera 195f, and the fourth image area of an image captured by the front camera 195g.

When an around view image is generated from the plurality of cameras, boundary parts may be produced among the respective image areas. The boundary parts may be processed through image blending to look natural when they are displayed.

Meanwhile, boundary lines 202a, 202b, 202c, and 202d may be displayed on the respective boundaries of a plurality of images.

The vehicle surroundings image 201 may include a vehicle image 700i. In some implementations, the vehicle image 700i may be generated by the processor 170.

The vehicle surroundings image 201 may be displayed through the display unit 741 of the vehicle or a display unit 180 of the driver assistance system.

FIGS. 7A to 7C are block diagrams illustrating an example interior of a driver assistance system.

In FIGS. 7A and 7B, the adaptive driver assistance system 100 may generate vehicle-related information by performing signal processing of an image received from the camera 195 based on computer vision. In some implementations, the vehicle-related information may include vehicle control information for direction control of the vehicle or vehicle driving assistance information for assisting the driver in driving.

In some implementations, the camera 195 may be a mono camera for capturing images of the front view or rear view of the vehicle. In some implementations, the camera 195 may include stereo cameras 195a and 195b for capturing images of the front view or rear view of the vehicle. In some implementations, the camera 195 may include around view cameras 195d, 195e, 195f and 195g for capturing images of surroundings of the vehicle.

FIG. 7A illustrates an example interior of the adaptive driver assistance system 100.

Referring to FIG. 7A, the adaptive driver assistance system 100 may include an input unit 110, a communication unit 120, an interface unit 130, a memory 140, a processor 170, a power supply 190, a camera 195, a display unit 180 and an audio output unit 185.

The input unit 110 may be equipped with a plurality of buttons or a touchscreen attached to the adaptive driver assistance system 100, in particular, the camera 195. The adaptive driver assistance system 100 may be turned on and operated through the plurality of buttons or the touchscreen. Various input operations may also performed through the buttons or touchscreen.

The communication unit 120 may wirelessly exchange data with the mobile terminal 600 or the server 500. In particular, the communication unit 120 may wirelessly exchange data with a mobile terminal of the vehicle driver. Wireless data communication schemes may include Bluetooth, Wi-Fi Direct, Wi-Fi, APiX, and NFC.

The communication unit 120 may receive weather information and traffic situation information (e.g., TPEG (Transport Protocol Expert Group)) from the mobile terminal 600 or the server 500. The adaptive driver assistance system 100 may transmit recognized real-time information to the mobile terminal 600 or the server 500.

When a user enters the vehicle, the mobile terminal 600 of the user may be paired with the adaptive driver assistance system 100 automatically or by execution of an application by the user.

The communication unit 120 may receive change-of-traffic light information from the external server 510. In some implementations, the external server 510 may be a server positioned at a traffic control center that controls traffic.

The interface unit 130 may receive vehicle-related or transmit a signal processed or generated by the processor 170. To this end, the interface unit 130 may perform data communication with the controller 770, the display apparatus 400, the sensing unit 760, the headlamp 200 and the like which are included in the vehicle through wired or wireless communication.

The interface unit 130 may receive navigation information through data communication with the controller 770, the display apparatus 400 or a separate navigation apparatus. In some implementations, the navigation information may include predetermined destination information, route information according to the destination, map information, and current location information, wherein the map information and the current location information are related to traveling of the vehicle. The navigation information may include information about the location of the vehicle on the road.

Meanwhile, the interface unit 130 may receive sensor information from the controller 770 or the sensing unit 760.

In some implementations, the sensor information may include at least one of vehicle direction information, vehicle location information (GPS information), vehicle orientation information, vehicle speed information, vehicle acceleration information, vehicle inclination information, vehicle drive/reverse information, battery information, fuel information, tire information, vehicular headlamp information, and interior temperature information, interior humidity information.

Such sensor information may be acquired from a heading sensor, a yaw sensor, a gyro sensor, a position module, a vehicle drive/reverse sensor, a wheel sensor, a vehicle speed sensor, a vehicle body tilt sensor, a battery sensor, a fuel sensor, a tire sensor, a steering sensor based on turning of the steering wheel, an interior temperature sensor, and an interior humidity sensor. The position module may include a GPS module for receiving GPS information.

Among the pieces of sensor information, the vehicle direction information, vehicle location information, vehicle orientation information, vehicle speed information and vehicle inclination information, which are related to traveling of the vehicle, may be called vehicle travel information.

The interface unit 130 may provide information about an object detected by the processor 170 to the headlamp 200.

In some implementations, the object may be a vehicle traveling in the opposite lane, a foregoing vehicle or a pedestrian.

The interface unit 130 may provide information about the distance to the object to the headlamp 200.

The interface unit 130 may provide information about change in relative location of the object to the headlamp 200.

The interface unit 130 may provide information about change in relative size of the object to the headlamp 200. The interface unit 130 may provide information about the windshield of a vehicle traveling in the opposite lane to the headlamp 200. In particular, the interface unit 130 may provide information about a part of the windshield of the vehicle traveling in the opposite lane on which the face of the driver of the vehicle traveling in the opposite lane is located. In some implementations, the part of the windshield of the vehicle traveling in the opposite lane on which the face of the driver of the vehicle traveling in the opposite lane is located may correspond to a windshield area close to the driver's seat in the vehicle traveling in the opposite lane.

If there is a plurality of vehicles traveling in the opposite lane, the interface unit 130 may provide the headlamp 200 with information about the respective windshields of the vehicles traveling in the opposite lane.

The interface unit 130 may provide the headlamp 200 with information about at least one of a rear windshield, side-view mirrors and a rearview mirror of a foregoing vehicle.

If there is a plurality of foregoing vehicles, the interface unit 130 may provide the headlamp 200 with information about at least one of a rear windshield, side-view mirrors and a rearview mirror of each foregoing vehicle.

The interface unit 130 may provide the headlamp 200 with information about the face of a pedestrian.

The memory 140 may store various kinds of data for overall operation of the adaptive driver assistance system 100 including a program for processing or controlling operation of the processor 170.

The memory 140 may store data for identifying an object. For example, if a predetermined object is detected in an image acquired through the camera 195, the memory 140 may store data for identifying the object according to a predetermined algorithm.

The memory 140 may store traffic information data. For example, if predetermined traffic information is detected in an image acquired through the camera 195, the memory 140 may store data for identifying the traffic information according to a predetermined algorithm.

When implemented through hardware, the memory 140 may include various storage devices such as a ROM, RAM, EPROM, flash drive, and hard drive.

The processor 170 may be configured to control overall operation of each unit in the adaptive driver assistance system 100.

The processor 170 may be configured to process an image of the vehicle front view image or a vehicle surroundings image acquired by the camera 195. In particular, the processor 170 is configured to perform signal processing based on computer vision. Thereby, the processor 170 may be configured to acquire an image of the front view or surroundings of the vehicle from the camera 195, and may be configured to detect and track an object based on the image. In particular, in detecting an object, the processor 170 may be configured to perform lane detection (LD), vehicle detection (VD), pedestrian detection (PD), bright spot detection (BD), traffic sign recognition (TSR), and road surface detection.

A traffic sign may represent predetermined information which can be delivered to the driver of the vehicle 700. The traffic sign may be delivered to the driver through a traffic light, a traffic signboard or a road surface. For example, the traffic sign may be a Go or Stop signal output from a traffic light for a vehicle or pedestrian. For example, the traffic sign may include various designs or texts marked on traffic signboards. For example, the traffic sign may include various designs or texts marked on the road surface.

The processor 170 may be configured to detect information in a vehicle front view image, vehicle rear view image or surroundings-of-vehicle image acquired by the camera 195.

The information may include forward objects information, rearward objects information, and road information.

The processor 170 may be configured to compare the detection information with information stored in the memory 140 to identify the information.

Meanwhile, the processor 170 may be configured to control zoom of the camera 195. For example, the processor 170 may be configured to control zoom of the camera 195 according to a result of the object detection. For example, if a traffic signboard is detected, but details marked on the traffic signboard are not detected, the processor 170 may control the camera 195 such that the camera 195 zooms in.

The processor 170 may be configured to receive weather information and traffic situation information (e.g., TPEG (Transport Protocol Expert Group)) through the communication unit 120.

The processor 170 may be configured to recognize, in real time, information about a traffic situation around the vehicle recognized by the adaptive driver assistance system 100 based on images.

The processor 170 may be configured to receive navigation information from the display apparatus 400 or a separate navigation apparatus through the interface unit 130.

The processor 170 may be configured to receive sensor information from the controller 770 or the sensing unit 760 through the interface unit 130. In some implementations, the sensor information may include at least one of vehicle direction information, vehicle location information (GPS information), vehicle orientation information, vehicle speed information, vehicle acceleration information, vehicle inclination information, vehicle drive/reverse information, battery information, fuel information, tire information, vehicular headlamp information, interior temperature information, interior humidity information and steering wheel rotation information.

The processor 170 may be configured to receive navigation information from the controller 770, the display apparatus 400, or a separate navigation apparatus through the interface unit 130.

The processor 170 may be configured to detect a relative distance to an object based on change in size of the object detected as time passes. The processor 170 may be configured to detect a relative speed of the detected object based on the detected relative distance and vehicle speed.

For example, if the mono camera 195 captures a front view image of the vehicle 700, the processor 170 may be configured to detect a front object. The processor 170 may be configured to detect a relative distance to the front object based on change in size of the front object detected as time passes. In some implementations, the front object may be a foregoing vehicle.

For example, if the mono camera 195 captures a rear view image of the vehicle 700, the processor 170 may be configured to detect a rear object. The processor 170 may be configured to detect a relative distance to the rear object based on change in size of the rear object detected as time passes. In some implementations, the rear object may be a following vehicle.

The processor 170 may be configured to track the detected object.

The processor 170 may be configured to detect change in relative location of the object through tracking. In some implementations, the change in relative location may be change in location of the object with respect to the vehicle 700.

The processor 170 may be configured to detect change in relative size of the object through tracking. In some implementations, the change in relative size may be change in size of the object with respect to the previous size of the object.

The processor 170 may be configured to detect the windshield of a vehicle traveling in the opposite lane. The processor 170 may be configured to detect feature points (e.g., corners of the windshield of a vehicle traveling in the opposite lane) to detect the windshield of the vehicle traveling in the opposite lane.

The processor 170 may be configured to detect a part of the windshield of the vehicle traveling in the opposite lane where the face of the driver of the vehicle traveling in the opposite lane. The processor 170 may be configured to detect the face of the driver of the vehicle traveling in the opposite lane to detect a part of the windshield of the vehicle traveling in the opposite lane where the face of the driver of the vehicle traveling in the opposite lane is located. In some implementations, the processor 170 may be configured to detect an area of the windshield close to the driver's seat in the vehicle traveling in the opposite lane as the part of the windshield where the face of the driver of the vehicle traveling in the opposite lane is located.

If there is a plurality of vehicles traveling in the opposite lane, the processor 170 may be configured to detect the windshield of each vehicle traveling in the opposite lane. The processor 170 may be configured to detect a part of the windshield of each vehicle traveling in the opposite lane where the face of the driver of each vehicle is located.

The processor 170 may be configured to detect at least one of a rear windshield, side-view mirrors and a rearview mirror of a foregoing vehicle. The processor 170 may detect at least one of a rear windshield, side-view mirrors and a rearview mirror of a foregoing vehicle through detection of feature points (e.g., corners of the rear windshield, side-view mirrors and rearview mirror of the foregoing vehicle).

If there is a plurality of foregoing vehicles, the processor 170 may be configured to detect at least one of a rear windshield, side-view mirrors and a rearview mirror of each foregoing vehicle.

Meanwhile, the processor 170 may be configured to detect a curve, uphill road or downhill road of the driving road.

The processor 170 may be configured to process a front view image of the vehicle to detect presence of a curve and curvature of the curve.

The processor 170 may be configured to process a front view image of the vehicle to detect an uphill road or downhill road.

For example, the processor 170 of the adaptive driver assistance system may create a depth map based on a preprocessed stereo image. The processor 170 of the adaptive driver assistance system may perform profiling of the road surface based on the depth map. The processor 170 of the adaptive driver assistance system may determine presence of an uphill road or downhill road ahead based on the profiled road surface. For example, the profiled road surface may provide heights in the YZ-plane. If the road surface extends by a distance longer than or equal to a predetermined distance in the positive direction of the Y axis while forming a predetermined angle with the Y axis, the processor 170 of the adaptive driver assistance system may determine that there is an uphill road ahead of the vehicle. If the road surface extends by a distance longer than or equal to a predetermined distance in the negative direction of the Y axis while forming a predetermined angle with the Y axis, the processor 170 of the adaptive driver assistance system may determine that there is a downhill road ahead of the vehicle. The processor 170 of the adaptive driver assistance system may determine inclination of the uphill road or downhill road based on profiling of the road surface. That is, the processor 170 of the adaptive driver assistance system may determine the inclination based on the length of the road surface along the Z axis and Y axis.

For example, the processor 170 of the adaptive driver assistance system may be configured to detect a lane in a stereo image. The processor 170 of the adaptive driver assistance system may be configured to determine presence of an uphill road or downhill road ahead of the vehicle based on the detected lane. For example, if the lane extends in the positive direction of the Y axis while forming a predetermined angle with the Y axis, the processor 170 of the adaptive driver assistance system may determine that there is an uphill road ahead of the vehicle. If the lane extends in the negative direction of the Y axis while forming a predetermined angle with the Y axis, the processor 170 of the adaptive driver assistance system may determine that there is a downhill road ahead of the vehicle. The processor 170 of the adaptive driver assistance system may determine inclination of the uphill road or downhill road based on the lane. That is, the processor 170 of the adaptive driver assistance system may determine the inclination based on the length of the lane along the Z axis and Y axis.

For example, the processor 170 of the adaptive driver assistance system may detect a plurality of fixed objects around the road in a stereo image. In some implementations, the plurality of objects may include street trees, streetlights or electricity poles. The processor 170 of the adaptive driver assistance system may track the locations, relative movements or sizes of objects arranged in series along the road to determine presence of an uphill road or downhill road ahead of the vehicle. For example, if streetlights having the same size are arranged along one side of the road, the processor 170 of the adaptive driver assistance system may calculate distances to the streetlights through the disparity operation. Among the streetlights, a distance to a first streetlight may be compared with a distance to a second streetlight on the Z axis and Y axis to determine presence of an uphill road or downhill road ahead of the vehicle. Meanwhile, the processor 170 of the adaptive driver assistance system may determine inclination of the uphill road or downhill road based on the plurality of objects. Specifically, the processor 170 of the adaptive driver assistance system may determine the inclination based on the distance to the first streetlight and second streetlight along the Z axis and Y axis.

For example, the processor 170 of the adaptive driver assistance system may determine presence of an uphill road or downhill road based on a vanishing point marked in a stereo image. For example, if the vanishing point is positioned above a reference line in the stereo image, the processor 170 may be configured to determine that there is an uphill road ahead. If the vanishing point is positioned below the reference line in the image, the processor 170 may be configured to determine that there is a downhill road ahead.

Meanwhile, the processor 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

The processor 170 may be controlled by the controller 770.

The display unit 180 may display various kinds of information processed by the processor 170. The display unit 180 may display an image related to operation of the adaptive driver assistance system 100. To display such image, the display unit 180 may include a cluster or HUD on the inner front of the vehicle. If the display unit 180 is an HUD, the unit may include a projection module for projecting an image onto the wind shied of the vehicle 700.

The audio output unit 185 may output sound based on an audio signal processed by the processor 170. To this end, the audio output unit 185 may include at least one speaker.

An audio input unit may receive a user's voice. To this end, the unit may include a microphone. The received voice may be converted into an electrical signal and delivered to the processor 170.

The power supply 190 may be controlled by the processor 170 to supply electric power necessary for operation of respective constituents. In particular, the power supply 190 may receive power from, for example, a battery in the vehicle.

The camera 195 acquires a vehicle front view image, a vehicle rear view image or a surroundings-of-vehicle image. The camera 195 may be a mono camera or stereo camera 195*a*, 195*b* for capturing the vehicle front view image or rear view image. In some implementations, the camera 195 may include a plurality of cameras 195*d*, 195*e*, 195*f* and 195*g* for capturing a surroundings-of-vehicle image.

The camera 195 may include an image sensor (e.g., CMOS or CCD) and an image processing module.

The camera 195 may process a still image or a moving image obtained by the image sensor. The image processing module may process the still image or moving image acquired through the image sensor. In some implementations, the image processing module may be configured separately from the processor 170 or integrated with the processor 170.

Zoom of the camera 195 may be controlled by the processor 170. For example, a zoom barrel included in the camera 195 may be moved as controlled by the processor 170, thereby setting the zoom.

The camera 195 may be controlled by the processor 170 to set the focus. For example, a focus barrel included in the camera 195 may be moved as controlled by the processor 170, thereby setting the focus. The focus may be automatically set based on the zoom setting.

Meanwhile, the processor 170 may be configured to automatically control the focus according to zoom control of the camera 195.

The camera 195 may detect a front object or rear object of the vehicle.

FIG. 7B illustrates an example interior of the adaptive driver assistance system 100.

Referring to FIG. 7B, the adaptive driver assistance system 100 of FIG. 7B differs from the adaptive driver assistance system 100 of FIG. 7A in that the system of FIG. 7B includes stereo cameras 195*a* and 195*b*. Hereinafter, description will be given focusing on this difference.

The adaptive driver assistance system 100 may include first and second cameras 195*a* and 195*b*. In some implementations, the first and second cameras 195*a* and 195*b* may be called stereo cameras.

The stereo camera 195*a* and 195*b* may be detachably formed on the ceiling or windshield of the vehicle 700. The stereo camera 195*a* and 195*b* may include a first lens 193*a* and a second lens 193*b*.

The stereo camera 195*a* and 195*b* may include a first light shield 192*a* and a second light shield 192*b*, which are intended to shield light incident on the first lens 193*a* and the second lens 193*b*, respectively.

The first camera 195*a* acquires a first image of the front view of the vehicle. The second camera 195*b* acquires a second image of the front view of the vehicle. The second camera 195*b* is spaced a predetermined distance from the first camera 195*a*. As the first and second cameras 195*a* and 195*b* are spaced a predetermined distance from each other, a disparity therebetween is produced, and a distance to an object may be detected according to the disparity.

If the adaptive driver assistance system 100 includes the stereo cameras 195*a* and 195*b*, the processor 170 performs signal processing based on computer vision. Thereby, the processor 170 may be configured to acquire stereo images of the front view of the vehicle from the stereo cameras 195*a* and 195*b*, perform disparity calculation based on the stereo images, perform object detection in at least one of the stereo images based on the calculated disparity information, and continuously track movement of an object after object detection. In some implementations, the stereo images are based on the first image received from the first camera 195*a* and the second image received from the second camera 195*b*.

In particular, in detecting an object, the processor 170 may be configured to perform lane detection (LD), vehicle detection (VD), pedestrian detection (PD), bright spot detection (BD), traffic sign recognition (TSR), and road surface detection.

In addition, the processor 170 may be configured to calculate the distance to a detected vehicle, the speed of the detected vehicle, and difference in speed from the detected vehicle.

The processor 170 may be configured to control zoom of the first and second cameras 195*a* and 195*b* individually. The processor 170 may be configured to periodically change the zoom ratio of the second camera 195*b*, keeping the zoom ratio of the first camera 195*a* constant. The processor 170 may be configured to periodically change the zoom ratio of the first camera 195*a*, keeping the zoom ratio of the second camera 195*b* constant.

The processor 170 may be configured to control the first or second camera 195*a* or 195*b* to zoom in or out with a predetermined periodicity.

The processor 170 may be configured to set the first camera 195a to a high zoom ratio to readily detect a distant object. The processor 170 may be configured to also set a low zoom ratio of the second camera 195b to readily detect a nearby object. The processor 170 may be configured to control the first camera 195a and the second camera 195b such that the first camera 195a zooms in and the second camera 195b zooms out.

In some implementations, the processor 170 may be configured to set the first camera 195a to a low zoom ratio to readily detect a nearby object. The processor 170 may be configured to also set a high zoom ratio of the second camera 195b to readily detect a distant object. The processor 170 may be configured to control the first camera 195a and the second camera 195b such that the first camera 195a zooms out and the second camera 195b zooms in.

For example, the processor 170 may be configured to control zoom of the first camera 195a or the second camera 195b according to a result of the object detection. For example, if a traffic signboard is detected, but details marked on the traffic signboard are not detected, the processor 170 may be configured to control the first camera 195a or the second camera 195b to zoom in.

Meanwhile, the processor 170 may be configured to automatically control the focus according to zoom control of the camera 195.

FIG. 7C illustrates an example interior of the adaptive driver assistance system 100.

The adaptive driver assistance system 100 of FIG. 7C differs from the adaptive driver assistance system 100 of FIG. 7A in that the adaptive driver assistance system 100 of FIG. 7C includes around view cameras 195d, 195e, 195f and 195g. Hereinafter, description will be given focusing on this difference.

The adaptive driver assistance system 100 may include around view cameras 195d, 195e, 195f and 195g.

Each of the around view cameras 195d, 195e, 195f and 195g may include a lens and a light shield for shielding light incident on the lens.

The around view cameras may include a left camera 195d, a rear camera 195e, a right camera 195f and a front camera 195g.

The left camera 195d acquires an image of the left side view of the vehicle. The rear camera 195e acquires an image of the rear view of the vehicle. The right camera 195f acquires an image of the right side view of the vehicle. The front camera 195g acquires an image of the front view of the vehicle.

Images acquired by the around view cameras 195d, 195e, 195f and 195g are delivered to the processor 170.

The processor 170 may be configured to synthesize a left view image, rear view image, right view image and front view image of the vehicle to generate a surroundings-of-vehicle image. In this case, the surroundings-of-vehicle image may be a top view image or bird's eye view image. The processor 170 may be configured to receive and synthesize the left view image, rear view image, right view image and front view image of the vehicle, and convert the synthesize image into a top view image to generate a surroundings-of-vehicle image.

The processor 170 may be configured to detect an object based on the surroundings-of-vehicle image. In particular, in detecting an object, the processor 170 may be configured to perform lane detection (LD), vehicle detection (VD), pedestrian detection (PD), bright spot detection (BD), traffic sign recognition (TSR), and road surface detection.

The processor 170 may be configured to detect a relative distance to the detected object or a relative speed of the object. Detection of the relative distance or relative speed may be performed as described above with reference to FIG. 7A or 7B.

The processor 170 may be configured to individually control zoom of the around view cameras 195d, 195e, 195f and 195g. Zoom control of the processor 170 may be performed in the same manner as zoom control of stereo cameras described above with reference to FIG. 7B.

Figure 8:
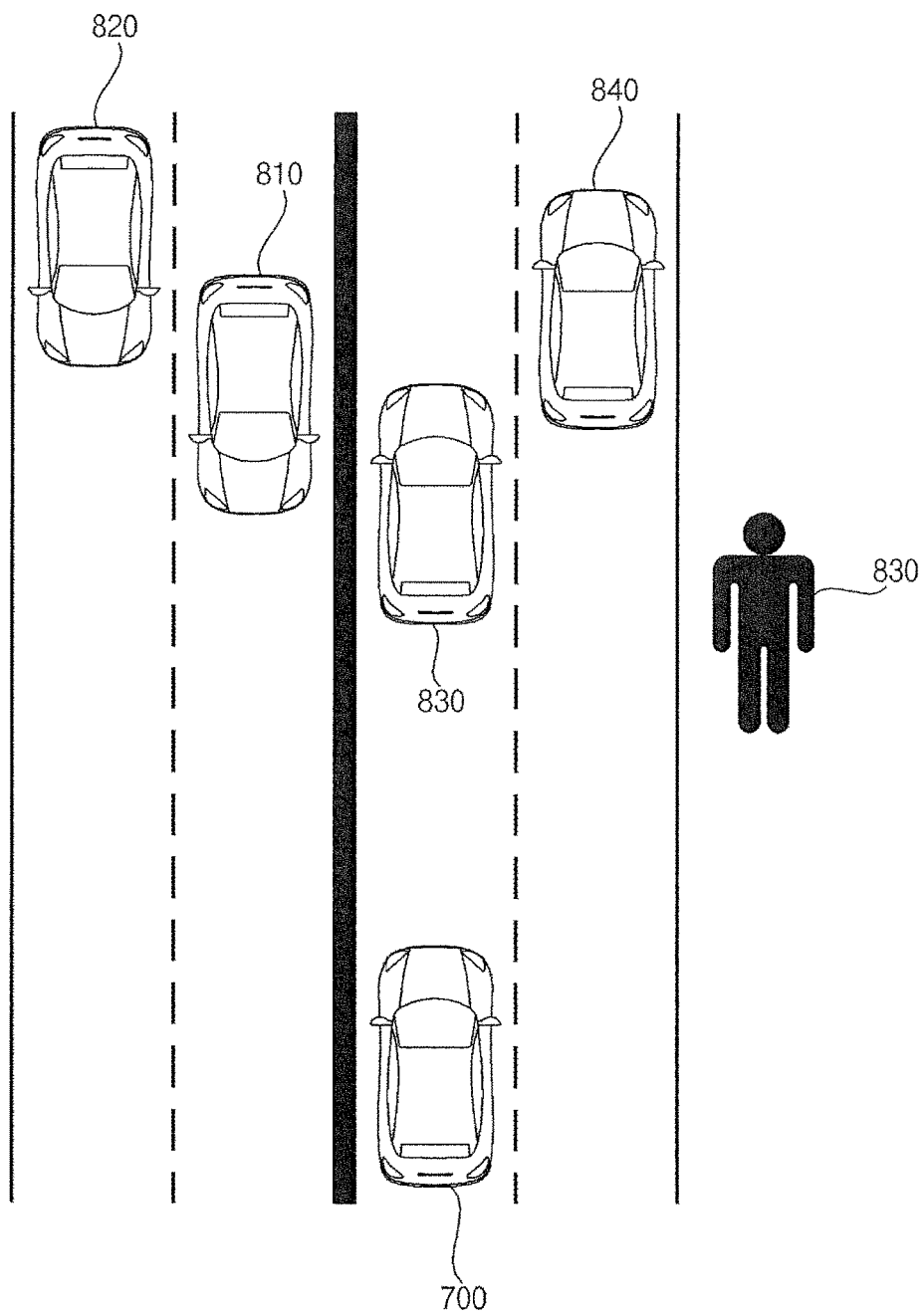
FIG. 8 is a diagram illustrating an example of detecting an object by an adaptive driver assistance system.

FIG. 8 illustrates an example of detecting an object by an adaptive driver assistance system.

Referring to FIG. 8, the adaptive driver assistance system 100 may acquire a front view image of the vehicle through the camera 195. In some implementations, the camera may include a mono camera, stereo cameras or a Time of Flight (TOF) camera.

The processor 170 of the adaptive driver assistance system may detect an object through image processing. In some implementations, the object may include vehicles 810 and 820 traveling in the opposite lane, foregoing vehicles 830 and 840 or a pedestrian 830.

The processor 170 may be configured to detect a distance to the object. The processor 170 may be configured to detect the distance to the object based on disparity or TOF. In addition, the processor 170 may be configured to detect a relative speed of the object based on the distance to the object.

The processor 170 may be configured to detect change in relative location of the object by tracking the object. In some implementations, the change in relative location may be change of location of the object with respect to the vehicle 700.

The processor 170 may be configured to detect change in relative size of the object by tracking the object. In some implementations, the change in relative size may be change in size of the object with respect to the previous size of the object.

FIGS. 9A to 16B are views illustrating operation of a headlamp corresponding to a detected object.

FIGS. 9A to 10B illustrate examples of operating a headlamp performed when a vehicle traveling in the opposite lane is detected.

Figure 9A:
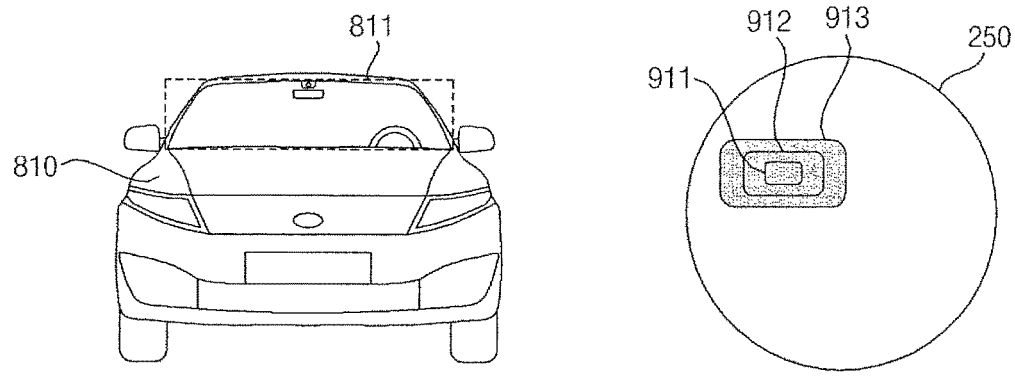
FIGS. 9A, 9B, 10A and 10B are diagrams illustrating an example of, operating a headlamp corresponding to a detected object.
Figure 9B:
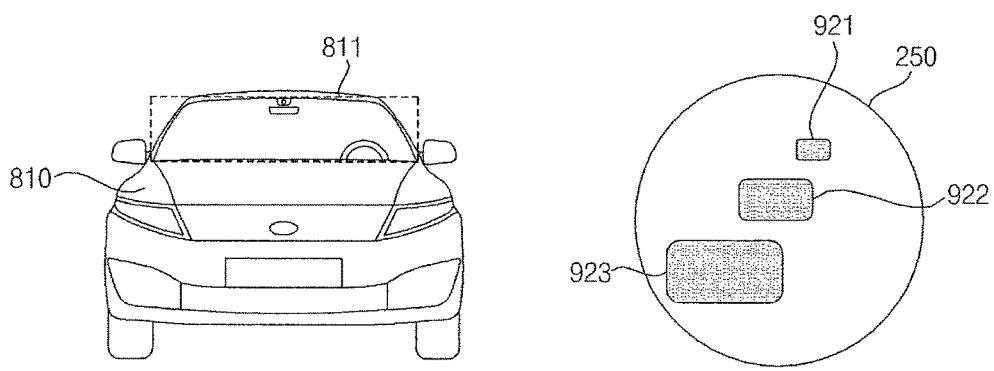

Referring to FIG. 9A, the adaptive driver assistance system 100 may detect the windshield 811 of a vehicle 810 traveling in the opposite lane.

The headlamp 200 may receive information about the windshield 811 of the vehicle traveling in the opposite lane from the adaptive driver assistance system 100 through the interface unit 280.

The processor 270 of the headlamp 200 one area 911, 912, 913 of the transparent display 250 corresponding to the windshield 811 of the vehicle 810 traveling in the opposite lane.

Meanwhile, the adaptive driver assistance system 100 may track the vehicle 810 traveling in the opposite lane in images acquired through the camera 195 to detect change in relative size of the vehicle traveling in the opposite lane.

The headlamp 200 may receive information about the change in relative size of the vehicle traveling in the opposite lane from the adaptive driver assistance system 100 through the interface unit 280.

The processor 270 of the headlamp 200 may change the size of one area of the transparent display 250 corresponding to the vehicle 810 traveling in the opposite lane according to change in size of the vehicle 810 traveling in the opposite lane.

For example, if the size of the vehicle 810 traveling in the opposite lane increases as the vehicle 810 moves, the processor 270 of the headlamp 200 may perform a control operation to gradually increase the size of one area 911, 912, 913 of the transparent display 250 corresponding to the vehicle traveling in the opposite lane.

Referring to 9B, the adaptive driver assistance system 100 may track the vehicle 810 traveling in the opposite lane in images acquired through the camera 195 to detect change in relative location of the vehicle traveling in the opposite lane.

The headlamp 200 may receive information about the change in relative location of the vehicle traveling in the opposite lane from the adaptive driver assistance system 100 through the interface unit 280.

The processor 270 of the headlamp 200 may change location of one area 921, 922, 923 of the transparent display 250 corresponding to the vehicle 810 traveling in the opposite lane according to change in location of the vehicle 810 traveling in the opposite lane.

For example, if the location of the vehicle 810 traveling in the opposite lane changes as the vehicle 810 moves, the processor 270 of the headlamp 200 may perform a control operation to change the location of one area 921, 922, 923 of the transparent display 250 corresponding to the vehicle traveling in the opposite lane.

Figure 10A:
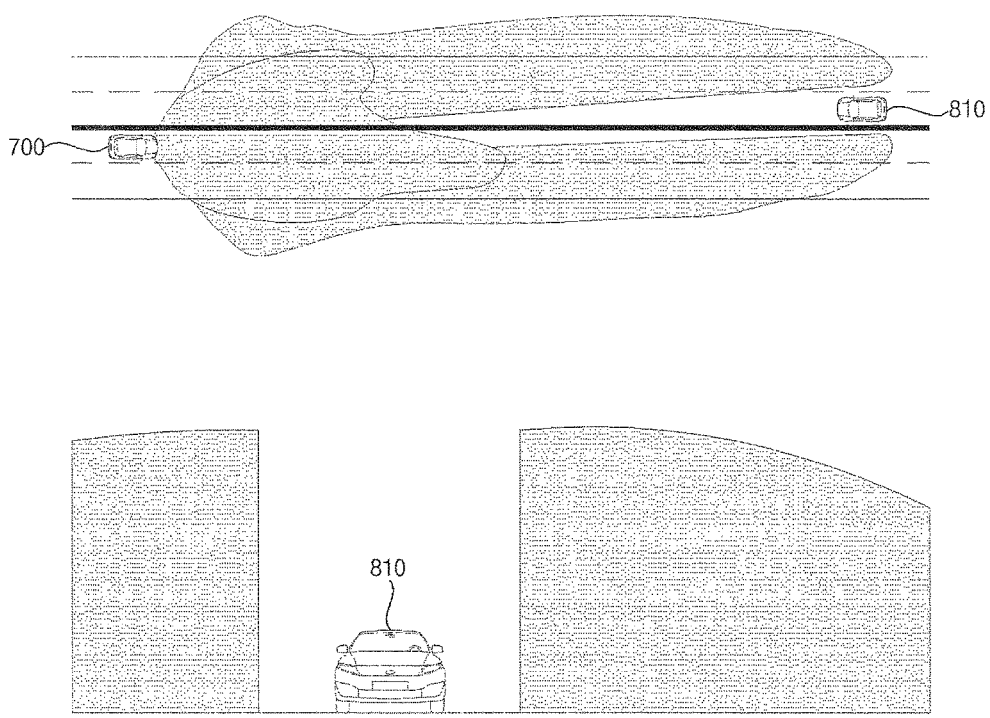
Figure 10B:
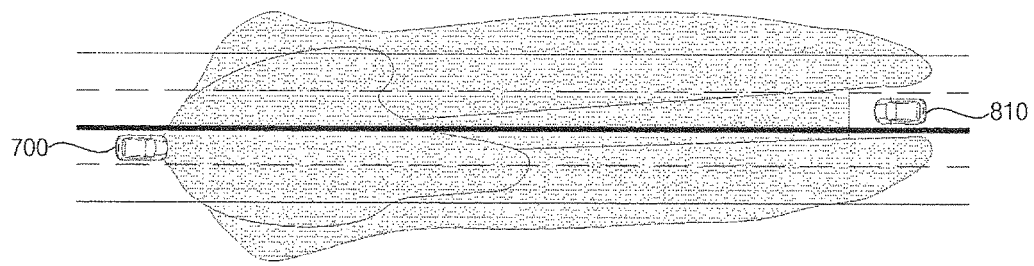
Figure 10B:
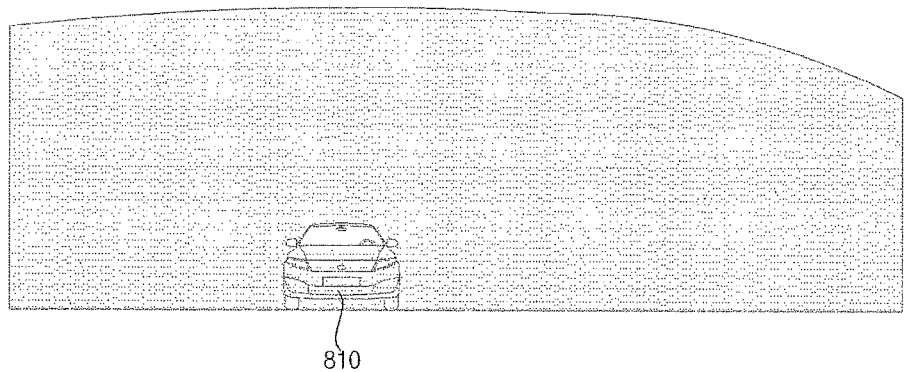

FIG. 10A exemplarily shows an emission range of a headlamp according to the conventional art, and FIG. 10B exemplarily shows an emission range of a headlamp.

As shown in FIG. 10A, when the vehicle 810 traveling in the opposite lane is sensed, the headlamp of the conventional art turns off a part of the light source such that light is not emitted onto the whole area of the vehicle 810 traveling in the opposite lane. In this case, the area onto which light is not emitted excessively increases, which may cause a problem in securing a sufficiently clear view for the driver of the vehicle 700.

As shown in FIG. 10B, when the vehicle 810 traveling in the opposite lane is sensed, the headlamp 200 may control the transparent display 250 such that light is not emitted onto only a part or the entirety of the windshield of the vehicle 810 traveling in the opposite lane.

Thereby, excessive interruption of light may be prevented. Accordingly, the driver of the vehicle traveling in the opposite lane may be prevented from being exposed to glare, and a clear view may be efficiently secured for the driver of the vehicle 700.

Figure 11:
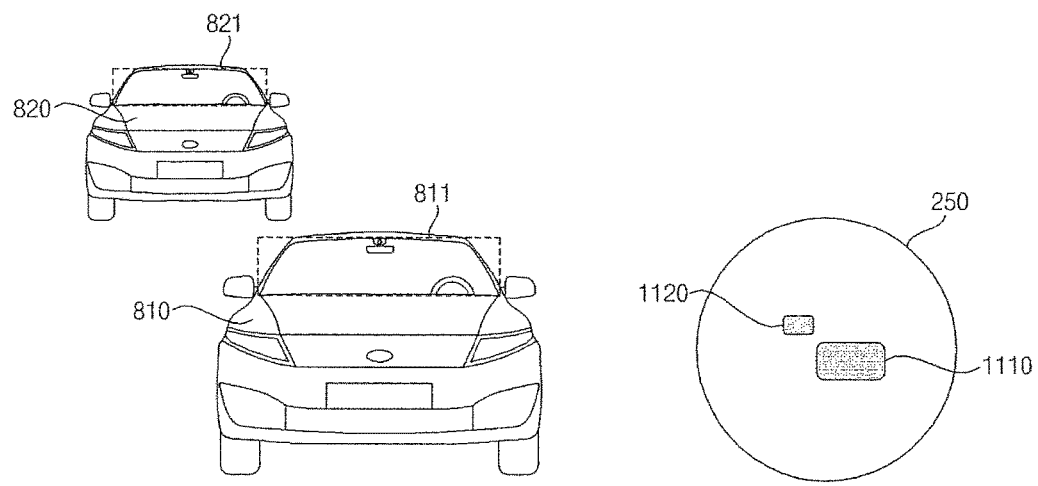
FIGS. 11, 12A, and 12B are diagrams illustrating an example of operating a headlamp corresponding to a detected object.
Figure 12A:
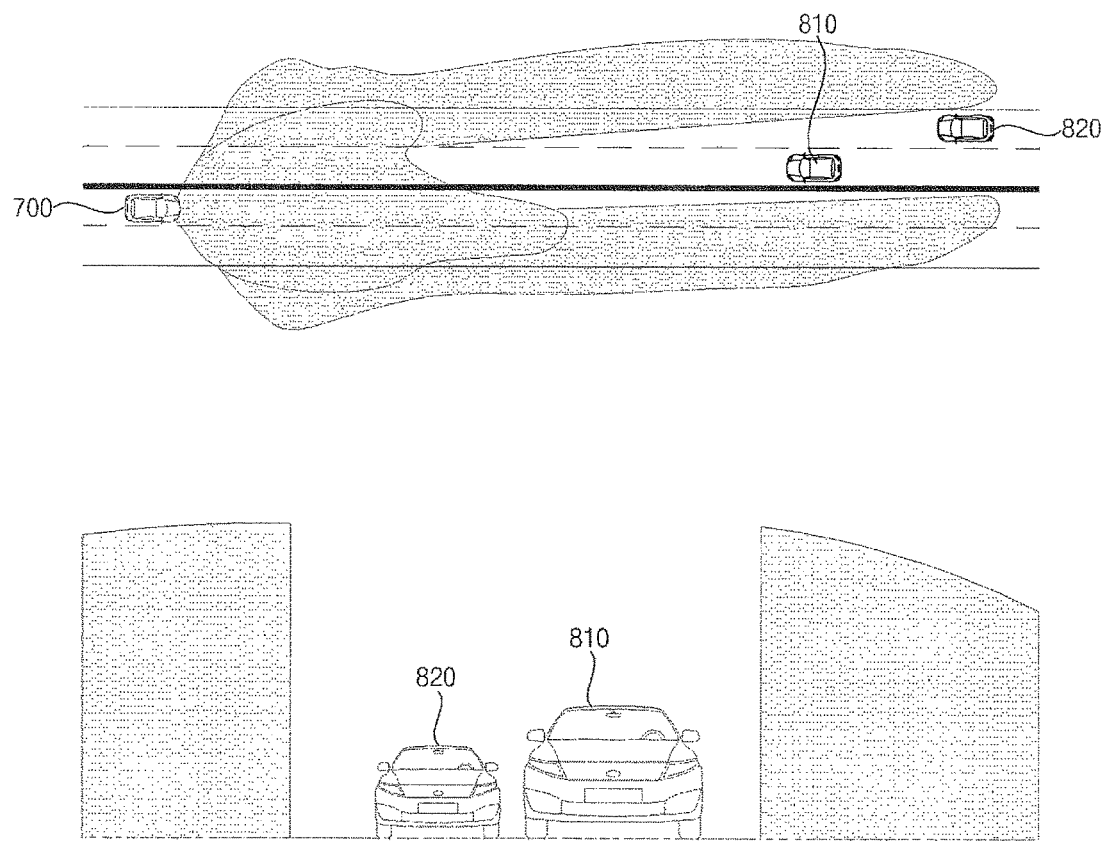
Figure 12B:
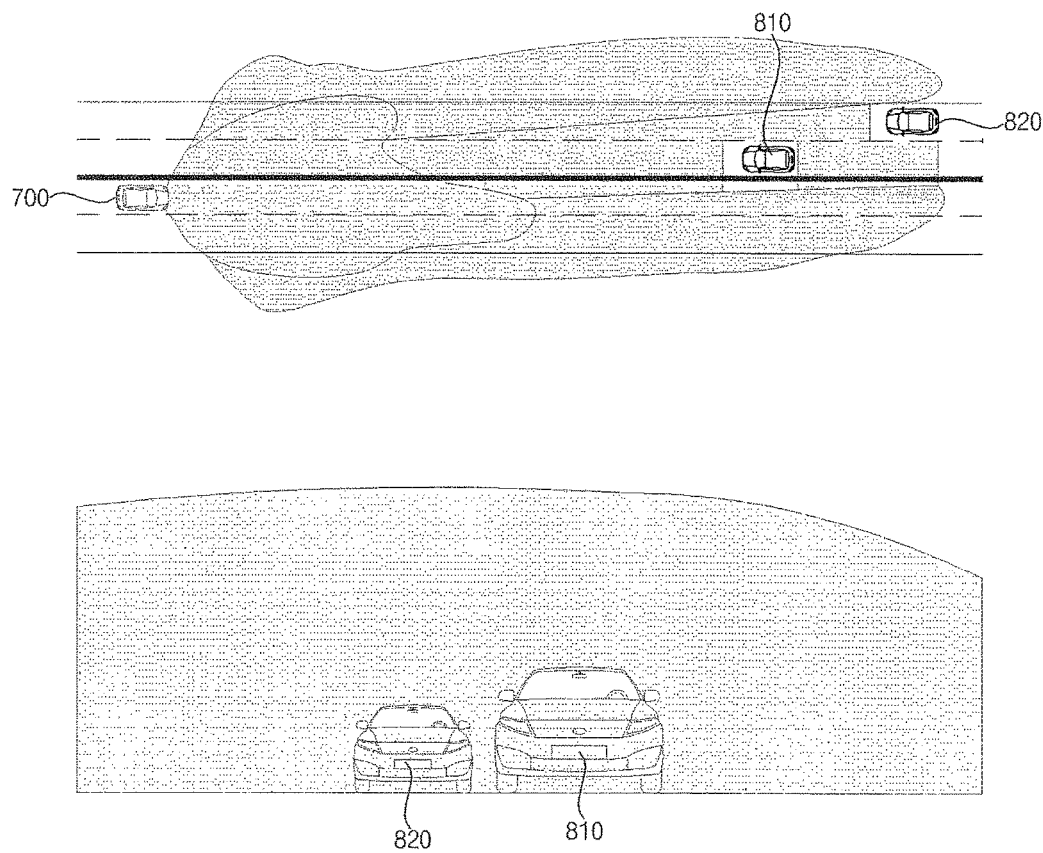

FIGS. 11 to 12B illustrate examples of operating a headlamp performed when a plurality of vehicles traveling in the opposite lane is detected.

Referring to FIG. 11, the adaptive driver assistance system 100 may detect windshields 811 and 821 of vehicles 810 and 820 traveling in the opposite lane.

The headlamp 200 may receive information about the windshields 811 and 821 of the vehicles 810 and 820 traveling in the opposite lane from the adaptive driver assistance system 100 through the interface unit 280.

The processor 270 of the headlamp 200 may perform a control operation to darken areas 1110 and 1120 of the transparent display 250 corresponding to the windshields 811 and 821 of the vehicles 810 and 820 traveling in the opposite lane, respectively.

FIG. 12A exemplarily shows an emission range of a headlamp according to the conventional art, and FIG. 12B exemplarily shows an emission range of a headlamp.

As shown in FIG. 12A, when a plurality of vehicles 810 and 820 traveling in the opposite lane is sensed, the headlamp of the conventional art turns off a part of the light source such that light is not emitted onto the whole area of the plurality of vehicles 810 and 820 traveling in the opposite lane. In this case, the area onto which light is not emitted excessively increases, which may cause a problem in securing a sufficiently clear view for the driver of the vehicle 700.

As shown in FIG. 12B, when the plurality of vehicles 810 and 820 traveling in the opposite lane is sensed, the headlamp 200 may control the transparent display 250 such that light is not emitted onto only a part or the entirety of the windshield 811, 821 of each of the vehicles 810 and 820 traveling in the opposite lane.

Thereby, excessive interruption of light may be prevented. Accordingly, the drivers of the vehicles traveling in the opposite lane may be prevented from being exposed to glare, and a clear view may be efficiently secured for the driver of the vehicle 700.

FIGS. 13A to 14B illustrate an example of operating a headlamp performed when a foregoing vehicle is detected.

Figure 13A:
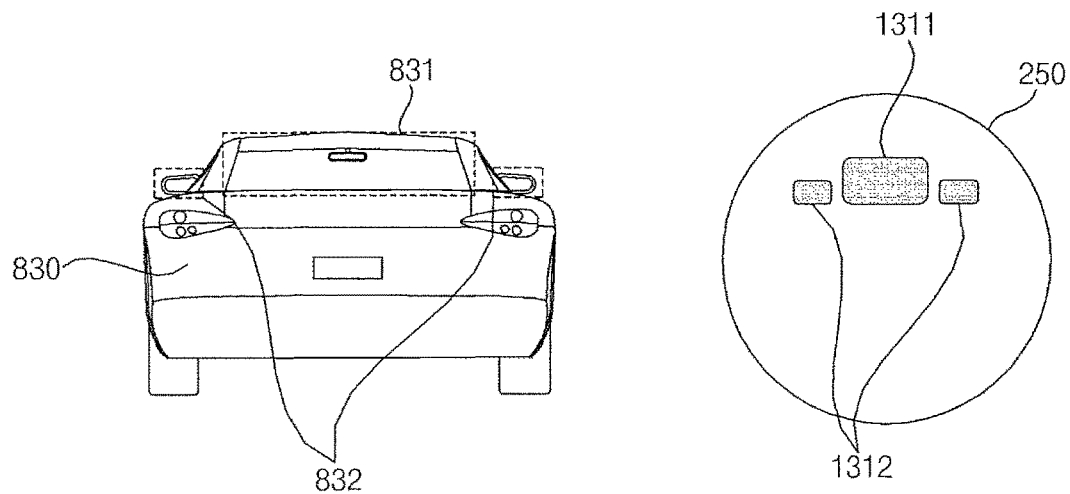
FIGS. 13A, 13B, 14A, and 14B are diagrams illustrating an example of operating a headlamp corresponding to a detected object.

Referring to FIG. 13A, the adaptive driver assistance system 100 may detect at least one of a rear windshield 831, side-view mirrors 832 and a rearview mirror 831 of a foregoing vehicle 830.

The headlamp 200 may receive information about at least one of the rear windshield 831, side-view mirrors 832 and rearview mirror 831 of the foregoing vehicle 830 from the adaptive driver assistance system 100 through the interface unit 280.

The processor 270 of the headlamp 200 may darken one area 1311, 1312 of the transparent display 250 corresponding to the at least one of the rear windshield 831, side-view mirrors 832 and rearview mirror 831 of the foregoing vehicle 830.

As described above with reference to FIGS. 9A and 9B, similar to the case of detecting the vehicle 810 traveling in the opposite lane, the processor 270 of the headlamp 200 may control the transparent display 250 according to change in size or location of the foregoing vehicle 830 in detecting the foregoing vehicle 830.

Figure 13B:
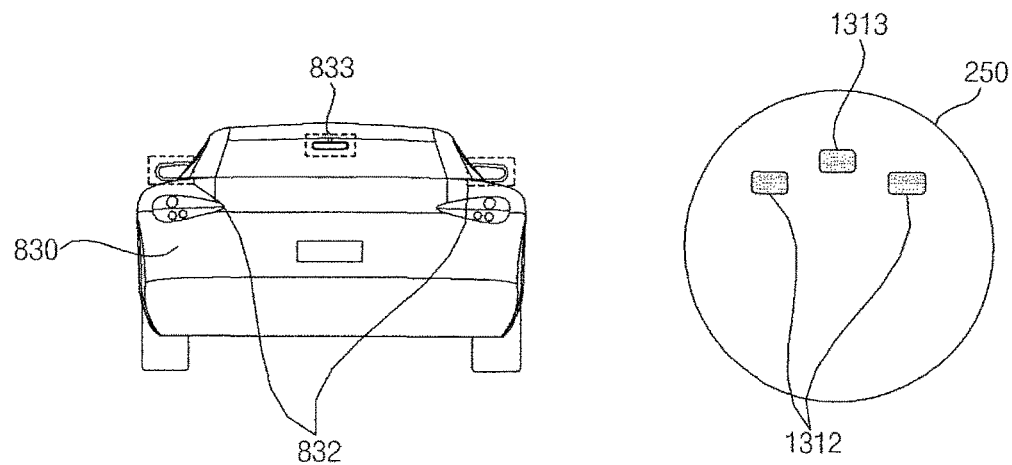

FIG. 13A illustrates an operation of darkening one area 1311, 1312 of the transparent display 250 corresponding to the rear windshield 831 and the side-view mirrors 832 of the foregoing vehicle 830. FIG. 13B illustrates an operation of darkening one area 1311, 1312 of the transparent display 250 corresponding to the side-view mirrors 832 and the rearview mirror 831 of the foregoing vehicle 830.

Figure 14A:
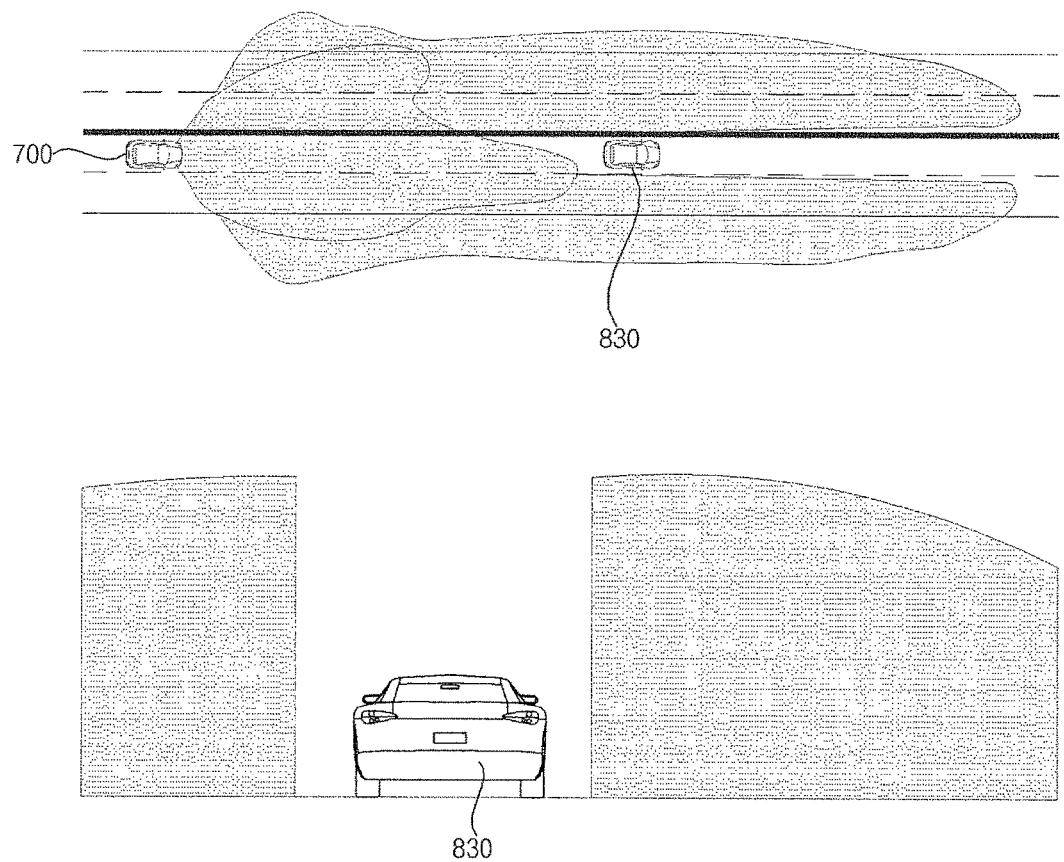
Figure 14B:
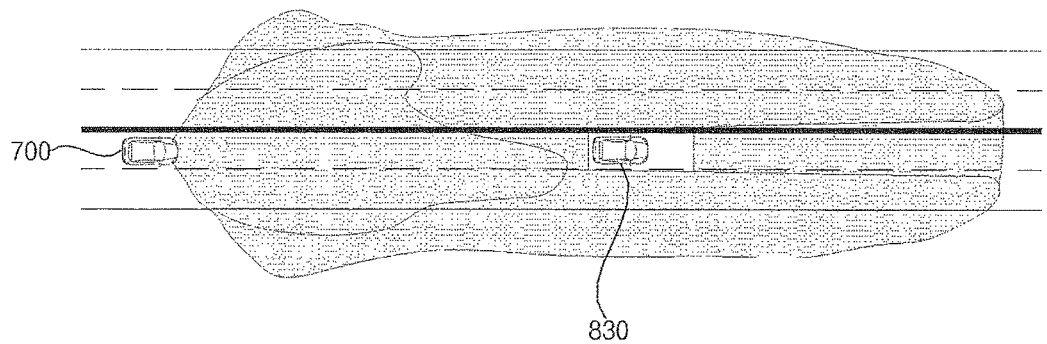
Figure 14B:
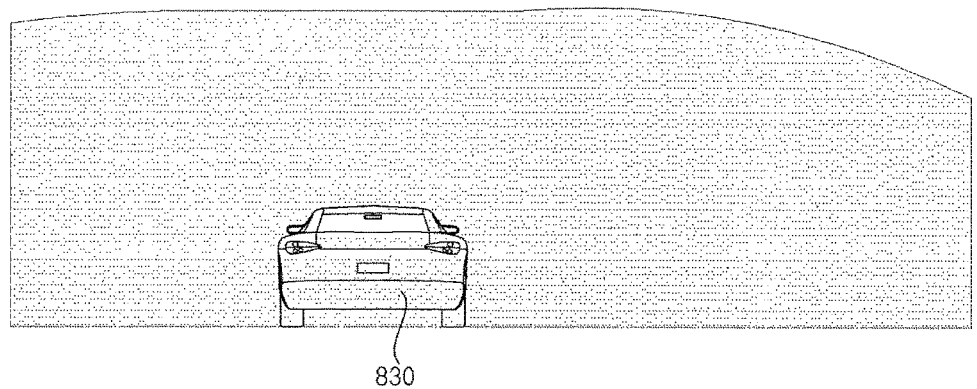

FIG. 14A exemplarily shows an emission range of a headlamp according to the conventional art, and FIG. 14B exemplarily shows an emission range of a headlamp.

As shown in 14A, when the foregoing vehicle 830 is sensed, the headlamp of the conventional art turns off a part of the light source such that light is not emitted onto the whole area of the foregoing vehicle 830. In this case, the area onto which light is not emitted excessively increases, which may cause a problem in securing a sufficiently clear view for the driver of the vehicle 700.

As shown in FIG. 14B, when the foregoing vehicle 830 is sensed, the headlamp 200 may control the transparent display 250 such that light is not emitted onto at least one of the rear windshield 831, side-view mirrors 832 and rearview mirrors 833 of the foregoing vehicle 830.

Thereby, excessive interruption of light may be prevented. Accordingly, the driver of the vehicle traveling in the opposite lane may be prevented from being exposed to glare, and a clear view may be efficiently secured for the driver of the vehicle 700.

Figure 15:
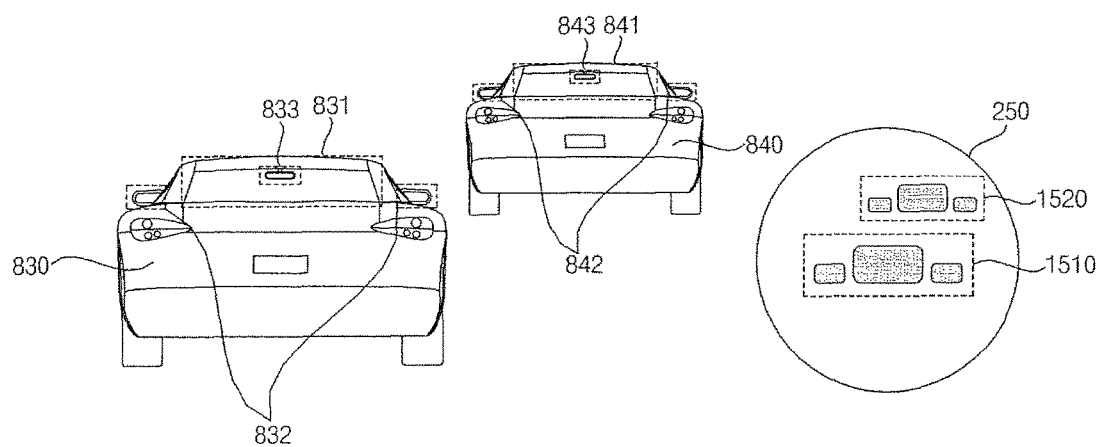
FIGS. 15, 16A, and 16B are diagrams illustrating an example of operating a headlamp corresponding to a detected object.
Figure 16A:
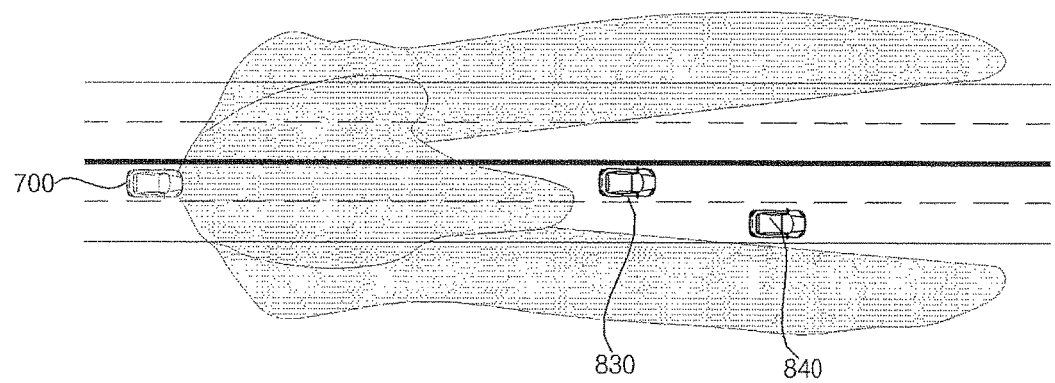
Figure 16A:
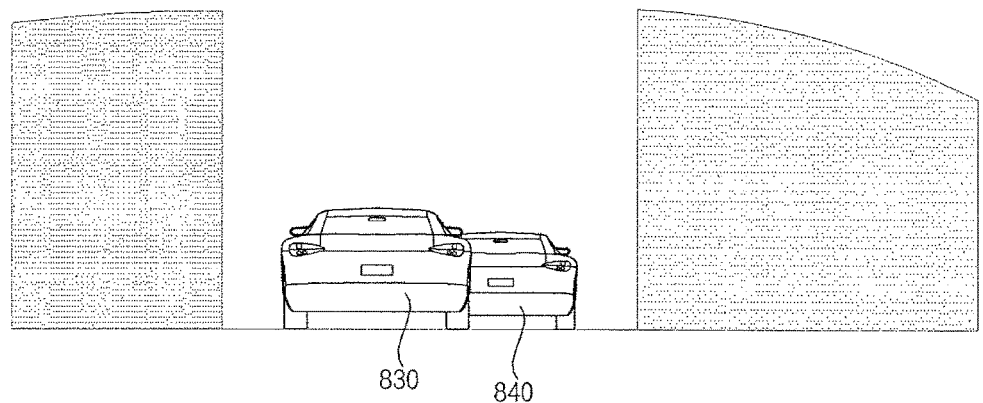
Figure 16B:
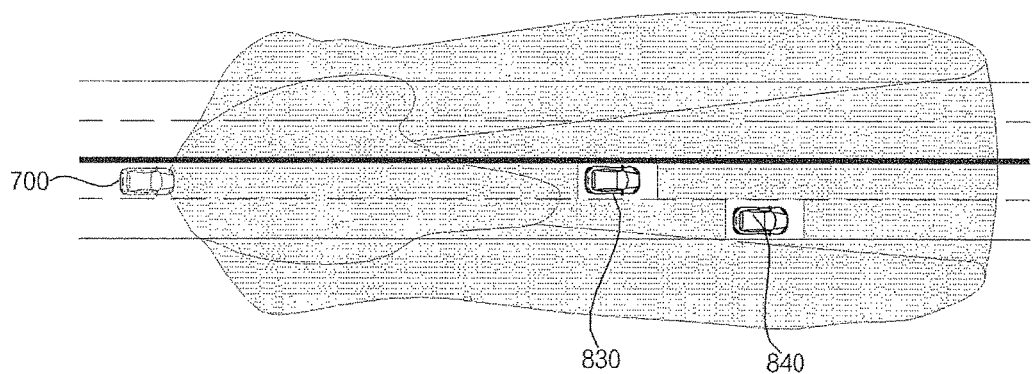
Figure 16B:
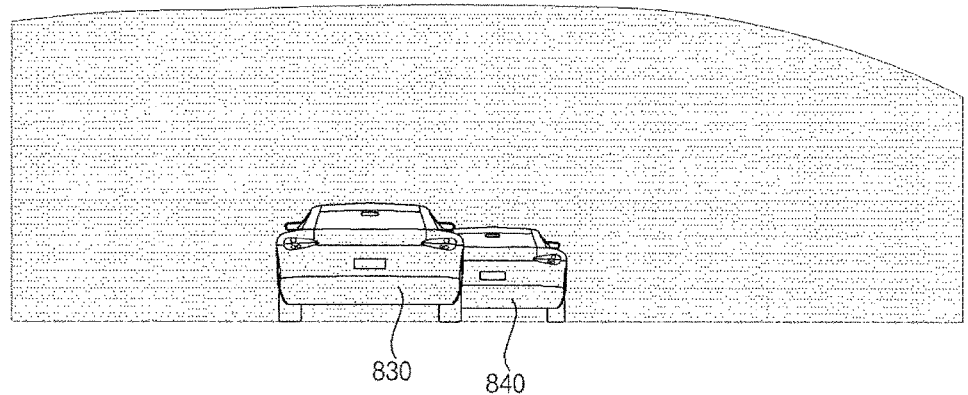

FIGS. 15 to 16B illustrate examples of operating a headlamp performed when a plurality of foregoing vehicles is detected.

Referring to FIG. 15, the adaptive driver assistance system 100 may detect at least one of a rear windshield 831, 841, a side-view mirror 832, 842 and a rearview mirror 833, 843 of each of the foregoing vehicles 830 and 840.

The headlamp 200 may receive information about at least one of the rear windshield 831, 841, side-view mirror 832, 842 and rearview mirror 833, 843 of each of the foregoing vehicles 830 and 840 from the adaptive driver assistance system 100 through the interface unit 280.

The processor 270 of the headlamp 200 may be configured to perform a control operation to darken each area 1510, 1520 of the transparent display 250 corresponding to at least one of the rear windshield 831, 841, side-view mirror 832, 842 and the rearview mirror 833, 843 of each of the foregoing vehicles 830 and 840.

FIG. 16A illustrates an example emission range of a headlamp according to the conventional art, and FIG. 16B exemplarily shows an emission range of a headlamp.

As shown in FIG. 16A, when a plurality of foregoing vehicles 830 and 840 is sensed, the headlamp of the conventional art turns off a part of the light source such that light is not emitted onto the whole area of the plurality of foregoing vehicles 830 and 840. In this case, the area onto which light is not emitted excessively increases, which may cause a problem in securing a sufficiently clear view for the driver of the vehicle 700.

As shown in FIG. 16B, when the plurality of foregoing vehicles 830 and 840 is sensed, the headlamp 200 may control the transparent display 250 such that light is not emitted onto only one of the rear windshield 831, 841, side-view mirror 832, 842 and rearview mirror 833, 843 of each of the foregoing vehicles 830 and 840.

Thereby, excessive interruption of light may be prevented. Accordingly, drivers of multiple vehicles traveling in the opposite lane may be prevented from being exposed to glare, and a clear view may be effectively secured for the driver of the vehicle 700.

The methods, techniques, systems, and apparatuses described herein may be implemented in digital electronic circuitry or computer hardware, for example, by executing instructions stored in tangible computer-readable storage media.

Apparatuses implementing these techniques may include appropriate input and output devices, a computer processor, and/or tangible computer-readable storage media storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Video Disks (DVDs). Any of the foregoing may be supplemented by, or incorporated in, specially designed application-specific integrated circuits (ASICs).

Although the operations of the disclosed techniques may be described herein as being performed in a certain order and/or in certain combinations, in some implementations, individual operations may be rearranged in a different order, combined with other operations described herein, and/or eliminated, and desired results still may be achieved. Similarly, components in the disclosed systems may be combined in a different manner and/or replaced or supplemented by other components and desired results still may be achieved.

As is apparent from the above description, at least one of the following effects can be obtained.

First, as a transparent display is provided and used to precisely control light emitted from headlamps, the driver of a vehicle traveling in the opposite lane or a foregoing vehicle may be prevented from being exposed to glare.

Second, light may be provided to ensure a wider view for the driver.

Third, when there is a plurality of vehicles traveling in the opposite lane or foregoing vehicles, light may be controlled to correspond to each of the vehicles. Thereby, the drivers of the vehicles traveling in the opposite lane or foregoing vehicles may be prevented from being exposed to glare.

Fourth, a transparent display may be controlled according to movement of a vehicle traveling in the opposite lane or a foregoing vehicle to adaptively control light emitted from the headlamps. Thereby, light directed to the driver of the vehicle traveling in the opposite lane or foregoing vehicle may be eliminated.

What is claimed is:

1. A headlamp for a vehicle comprising:
an interface unit configured to receive information about an object external to the vehicle;
at least one light source configured to generate light;
a transparent display configured to allow at least a portion of the light to pass through the transparent display; and
a processor configured to control the transparent display to darken a first area of the transparent display corresponding to the object to block transmission of the light through the area of the transparent display, the area of the transparent display being less than an entirety of the transparent display,
wherein the processor is configured to darken the first area gradually as a distance between the vehicle and the object decreases, and
wherein the processor is configured to darken the first area such that at least one of color and brightness of the first area is different from color or brightness of a second area of the transparent display.

2. The headlamp according to claim 1, wherein the processor configured to change a location or a size of the area within the transparent display based on a location or a size of the object.

3. The headlamp according to claim 1, wherein the object is a vehicle traveling in opposite direction, a foregoing vehicle, or a pedestrian.

4. The headlamp according to claim 3, wherein, when the object is the vehicle traveling in the opposite lane,
the processor configured to control the transparent display to darken the first area of the transparent display based on a windshield of the vehicle traveling in the opposite lane.

5. The headlamp according to claim 4, wherein the processor configured to darken the first area of the transparent display based on a part of the windshield of the vehicle traveling in the opposite lane, a face of a driver of the vehicle traveling in the opposite lane being positioned at the part of the windshield.

6. The headlamp according to claim 4, wherein, when the vehicle traveling in the opposite lane comprises a plurality of vehicles traveling in the opposite lane,
- the processor configured to darken an area based on the windshield of each of the vehicles traveling in the opposite lane.

7. The headlamp according to claim 3, wherein, when the object is the foregoing vehicle,
- the processor configured to control the transparent display to darken the first area of the transparent display based on at least one of a rear windshield, side-view mirrors, and a rearview mirror of the foregoing vehicle.

8. The headlamp according to claim 7, wherein, when the foregoing vehicle comprises a plurality of foregoing vehicles,
- the processor configured to darken an area of the transparent display based on at least one of a rear windshield, side-view mirrors, and a rearview mirror of each of the foregoing vehicles.

9. The headlamp according to claim 8, wherein the plurality of foregoing vehicles travels on the same lane or neighboring lanes.

10. The headlamp according to claim 3, where the object is the pedestrian,
- the processor configured to darken the first area of the transparent display corresponding to a face of the pedestrian.

11. The headlamp according to claim 1, wherein the processor configured to:
- receive information about curve, uphill road, or downhill road of a driving lane;
- change position of the light in response to the information about curve, uphill road, or downhill road of the driving lane; and
- darken the area of the transparent display corresponding to the object based on the changed position of the light.

12. The headlamp according to claim 1, further comprising:
- an aspheric lens configured to allow the light generated by the light source to be refracted and pass through the aspheric lens,
- wherein the transparent display is disposed at a front end or rear end of the aspheric lens.

13. The headlamp according to claim 1, further comprising:
- an outer lens covering an opening of the headlamp,
- wherein the transparent display is disposed at a rear end of the outer lens.

14. A vehicle comprising:
- an adaptive driver assistance system comprising: a camera to acquire an image of a vehicle; a first processor configured to detect a vehicle traveling in opposite lane or a foregoing vehicle from the acquired image; and a first interface unit to transmit information about the detected vehicle traveling in the opposite lane or information about the detected foregoing vehicle to a headlamp; and
- the headlamp comprising a second interface unit configured to receive the information about the detected vehicle traveling in the opposite lane or the information about the detected foregoing vehicle; at least one light source to generate light; a transparent display configured to allow at least a portion of the light to pass through the transparent display; and a second processor configured to, based on the information about the detected vehicle traveling in the opposite lane or the information about the detected foregoing vehicle, control the transparent display to darken a first area of the transparent display corresponding to the object to block transmission of the light through the area of the transparent display, the first area of the transparent display being less than an entirety of the transparent display,
- wherein the second processor is configured to darken the first area gradually as a distance between the vehicle and the object decreases, and
- wherein the second processor is configured to darken the first area such that at least one of color and brightness of the first area is different from color or brightness of a second area of the transparent display.

* * * * *